United States Patent
Welter et al.

(10) Patent No.: US 11,966,320 B1
(45) Date of Patent: Apr. 23, 2024

(54) TECHNIQUES FOR CAPTURING SOFTWARE APPLICATION SESSION REPLAY DATA FROM DEVICES

(71) Applicant: LogRocket, Inc., Boston, MA (US)

(72) Inventors: Mckenzie Bruder Welter, Somerville, MA (US); Aimee Su Mun, Central Islip, NY (US)

(73) Assignee: LogRocket, Inc., Boston, MA (US)

( * ) Notice: Subject to any disclaimer, the term of this patent is extended or adjusted under 35 U.S.C. 154(b) by 0 days.

(21) Appl. No.: 18/320,273

(22) Filed: May 19, 2023

Related U.S. Application Data

(60) Provisional application No. 63/499,273, filed on May 1, 2023.

(51) Int. Cl.
  *G06F 11/00* (2006.01)
  *G06F 11/34* (2006.01)

(52) U.S. Cl.
  CPC ...... *G06F 11/3476* (2013.01); *G06F 11/3438* (2013.01)

(58) Field of Classification Search
  CPC ............ G06F 11/3476; G06F 11/3438; G06F 11/302; G06F 11/3604
  See application file for complete search history.

(56) References Cited

U.S. PATENT DOCUMENTS

| | | | |
|---|---|---|---|
| 9,990,110 B1 | 6/2018 | Lounibos et al. | |
| 2007/0240055 A1 | 10/2007 | Ting et al. | |
| 2012/0317549 A1* | 12/2012 | Cunningham | G06F 11/3612 717/127 |
| 2013/0066949 A1* | 3/2013 | Colrain | G06F 9/466 709/203 |
| 2022/0043879 A1* | 2/2022 | Trigalo | G06F 16/953 |
| 2023/0214240 A1* | 7/2023 | Parejo | G06F 11/323 715/700 |

OTHER PUBLICATIONS

[No Author Listed], Developer Documentation. SKIA. https://skia.org/docs/dev [last accessed Sep. 14, 2023], 1 page.
[No Author Listed], User Documentation. SKIA. https://skia.org/docs/user/ [last accessed Sep. 14, 2023], 1 page.

* cited by examiner

*Primary Examiner* — Charles Ehne
(74) *Attorney, Agent, or Firm* — Wolf, Greenfield & Sacks, P.C.

(57) ABSTRACT

Described herein are techniques for capturing data from devices to generate replays of sessions of a software application executed by the devices. The techniques use data obtained from the device to determine whether certain events in which a session replay is to be generated have occurred in a session of the software application. When occurrence of such an event is detected during the session of the software application, the techniques determine to trigger collection of session replay data. In this case, the session replay data may be stored and/or transmitted from the device for storage, and subsequently used to generate a session replay. If none of the events are detected, then session replay data may not be transmitted. Accordingly, the techniques can selectively allocate resources (e.g., compute, storage, and/or communication resources) for sessions in which events are detected.

19 Claims, 18 Drawing Sheets

TECHNIQUES FOR CAPTURING SOFTWARE APPLICATION SESSION REPLAY DATA FROM DEVICES

RELATED APPLICATIONS

This application claims priority under 35 U.S.C. § 119(e) to U.S. Provisional Application Ser. No. 63/499,273, titled "TECHNIQUES FOR CAPTURING SOFTWARE APPLICATION SESSION REPLAY DATA FROM DEVICES," filed on May 1, 2023, which is herein incorporated by reference in its entirety.

FIELD

Aspects of the present disclosure relate to techniques for capturing data from devices to replay interactive sessions of a software application executed by the devices. In particular, the techniques determine whether to capture data from a given device to generate a replay of a session, while a session of the software application is being executed by the device. The techniques can determine whether (or not) to allocate resources to capturing data for sessions that a user (e.g., a software developer, technical support, and/or another user) would be interested in viewing a replay of.

BACKGROUND

A software application may be used by a large number of users (e.g., thousands of users). For example, the software application may be a mobile application accessed using a mobile device (e.g., a smartphone). The mobile application may be accessed hundreds or thousands of times on a daily basis by users through various different sessions. Users may interact with the mobile application through a graphical user interface (GUI) of the mobile application presented on mobile devices.

SUMMARY

Described herein are techniques for capturing data from devices to generate replays of sessions of a software application executed by the devices. The techniques use data obtained from the device to determine whether certain events in which a session replay is to be generated have occurred in a session of the software application. When occurrence of such an event is detected during the session of the software application, the techniques determine to trigger collection of session replay data. In this case, the session replay data may be stored and/or transmitted from the device for storage, and subsequently used to generate a session replay. If none of the events are detected, then session replay data may not be transmitted. Accordingly, the techniques can selectively allocate resources (e.g., compute, storage, and/or communication resources) for sessions in which events are detected.

Some embodiments provide a method of capturing data from a device to replay a session of an application executed by the device. The method comprises: using a processor of the device to perform: accessing event configuration information indicating one or more events for which data for generating a session replay is to be transmitted from the device; collecting data from the software application during a time period within the session; determining, using the data collected during the time period and the event configuration information, whether an event of the one or more events occurred during the time period; determining whether to trigger collection of data to generate a session replay based on whether an event of the one or more events occurred during the time period; when it is determined to trigger collection of data to generate a session replay: transmitting, to a system separate from the device, data associated with a sequence of visualizations rendered by the device in the GUI of the software application during the session to generate the session replay.

Some embodiments provide a device that captures data to replay a session of an application executed by the device. The device comprises a processor configured to perform: accessing event configuration information indicating one or more events for which data for generating a session replay is to be transmitted from the device; collecting data from the software application during a time period within the session; determining, using the data collected during the time period and the event configuration information, whether an event of the one or more events occurred during the time period; determining whether to trigger collection of data to generate a session replay based on whether an event of the one or more events occurred during the time period; when it is determined to trigger collection of data to generate a session replay: transmitting, to a system separate from the device, data associated with a sequence of visualizations rendered by the device in the GUI of the software application during the session to generate the session replay.

Some embodiments provide a non-transitory computer-readable storage medium storing instructions. The instructions, when executed by a processor, cause the processor to perform a method of capturing data from a device to replay a session of an application executed by the device. The method comprises: accessing event configuration information indicating one or more events for which data for generating a session replay is to be transmitted from the device; collecting data from the software application during a time period within the session; determining, using the data collected during the time period and the event configuration information, whether an event of the one or more events occurred during the time period; determining whether to trigger collection of data to generate a session replay based on whether an event of the one or more events occurred during the time period; when it is determined to trigger collection of data to generate a session replay: transmitting, to a system separate from the device, data associated with a sequence of visualizations rendered by the device in the GUI of the software application during the session to generate the session replay.

Some embodiments provide a system for generating replays of sessions of a software application executed by a plurality of devices. The system comprises a processor and a non-transitory computer-readable storage medium storing instructions that, when executed by the processor. The instructions, when executed by the processor, cause the processor to: generate event configuration information indicating one or more events in which a session replay is to be generated; transmit, to the plurality of devices, the event configuration, wherein the event configuration information causes the plurality of devices to monitor for occurrence of the one or more events during execution of the software application and to transmit data for generation of a session replay based on detecting occurrence of any of the one or more events; after occurrence of at least one of the one or more events on at least one of the plurality of devices: obtain, from the at least one device, data associated with at least one sequence of visualizations rendered by the at least one device in a graphical user interface (GUI) of the software application during at least one session of the software application executed by the at least one device; and generate, using the data associated with the at least one sequence of visualizations rendered by the at least one device in a GUI of the software application, at least one replay of the at least one session.

There has thus been outlined, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

Figure 1A:
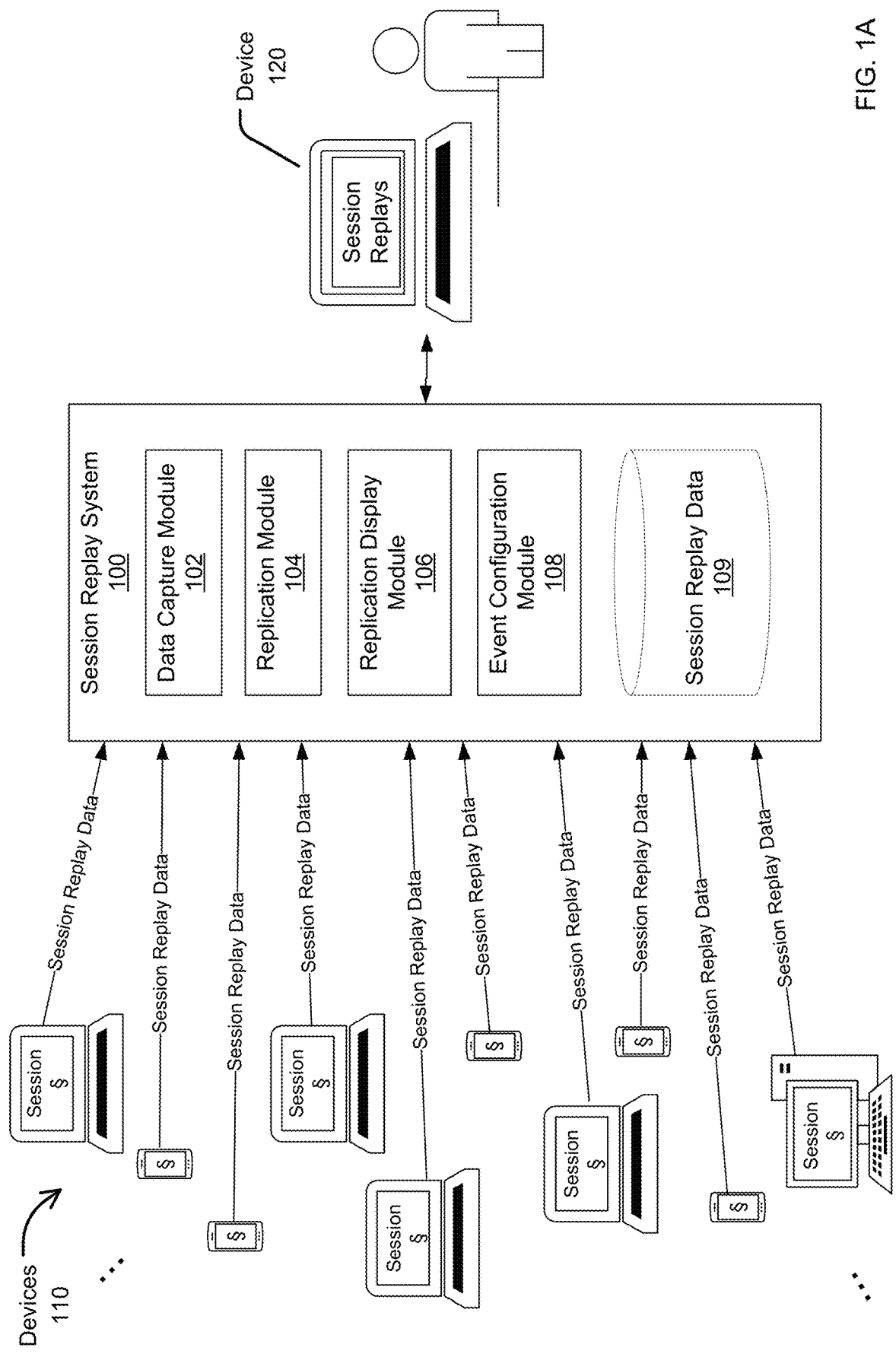
FIG. 1A is an environment in which some embodiments of the technology described herein may be implemented.

Described herein are techniques for efficiently capturing data from devices to replay user sessions of a software application executed by the devices. The data captured from a device for generating a replay of an application session may also be referred to herein as "session replay data". Session replay data may include data associated with a sequence of visualizations rendered during an application session (e.g., in a GUI of the software application).

In order to diagnose an issue that occurred in a software application session, it may be helpful to view the sequence of events in the session leading up to and/or after occurrence of the issue. For example, a software developer, technical support expert, product manager, or other user may need to diagnose a cause of an application error that occurred during a session of the application. Viewing the sequence of events leading up to and/or after occurrence of the application error in the session may facilitate diagnosing a cause of the application error. For example, viewing the sequence of events may reveal certain actions performed by a user, a state of the software application prior to and/or after occurrence of the issue, a failure to respond to a request in the software application, a nonoperational graphical element in a GUI of the software application, and/or other information. The information may be used to identify and/or resolve the issue in the software application.

During a session of a software application, a sequence of visualizations may be rendered in, or otherwise associated with, a GUI of the software application. The sequence of visualizations may be associated with user interactions with the software application through the GUI during the session. For example, in a software application being executed by a smartphone with a touch screen, a user may select graphical elements (e.g., by tapping locations on a screen), drag graphical elements across a screen, type in values using a keyboard application, provide image data using a camera of a device, and/or interact with the mobile application in other ways. Replaying a sequence of visualizations rendered in a software application GUI may allow a user to visualize a sequence of events in a session (e.g., to diagnose an issue that occurred in the session). The replay may be displayed on other devices (e.g., through an Internet website) to allow users to view the sequence of visualizations. For example, software developers, technical support experts, and/or product managers may view the replay to identify issues in the software application.

To generate a replay of a session of a software application, a system may replicate visualizations rendered during the session in a replay GUI. Data obtained from the device may be used to determine the rendered visualizations, and to replicate the visualizations in a replay GUI. Accordingly, generating a replay of the session can involve collecting session replay data from the device, use of network resources to transmit the session replay data from the device to a system that will generate the replay, data storage space for storing the session replay data, and/or processing to generate the replay (e.g., by determining replication operations and executing them to display replications of visualizations from the session).

A software application may be accessed through a large number of sessions across multiple different devices. For example, an enterprise software application may be accessed by over one hundred (100) million sessions or more in a given month. Storing sufficient data to generate a replay for such a large number of sessions would involve significant compute resources, such as the use of compute time to collect session replay data from all the sessions (and additional resources to generate replays for the sessions), storage space to store the session replay data from all the sessions, and communication bandwidth for transmission of the session replay data. A large number of sessions (e.g., tens of thousands, hundreds of thousands, millions, or hundreds of millions, etc.) thus requires a large amount of computation, storage, and communication resources.

The inventors have recognized that a user (e.g., software development team, technical support team, product manager, and/or other user) may only be interested in viewing replays of certain sessions of a software application. The sessions of interest may meet certain criteria. For example, a user may only be interested in viewing replays of sessions that lasted a threshold amount of time, sessions in which a particular type of error occurred, sessions in which a particular action was performed by a user, and/or sessions meeting other conditions. Session replay data that is collected from sessions that do not meet the desired criteria may be ignored by the user and/or otherwise go unneeded. Thus, compute, storage, and communication resources used for capturing data and generating replays for those sessions are wasted. Moreover, the inventors have recognized that session replay data captured for multiple different sessions may be duplicative. For example, a given (same) issue may occur in multiple different sessions. However, session replay data from a subset of the sessions in which the issue occurred may be sufficient for diagnosing and resolving the issue. Thus, session replay data captured for additional sessions beyond the subset may be duplicative and/or otherwise provide little additional value.

Accordingly, the inventors have developed techniques for efficiently capturing session replay data for software application sessions of interest (as opposed to all sessions). The techniques can use a set of one or more events to identify application sessions for which to collect session replay data. The set of event(s) may be configurable. For example, a user may specify the set of event(s) in which the user would want to capture session replay data for a session and/or generate a replay. The techniques can monitor for occurrence of the event(s), and trigger collection of session replay data only when occurrence of one (or more) of the event(s) is detected. The techniques thus programmatically allocate resources for capturing of session replay data to sessions that are most likely to be useful to a user. As a result, the techniques more efficiently capture session replay data from multiple devices by reducing computation, storage, and communication resources used in capturing data and generating replays.

Some embodiments provide techniques for capturing data from a device to replay a session of a software application executed by the device. The techniques involve accessing event configuration information indicating one or more events in which data for generation of a session replay is to be transmitted from the device. A system (e.g., a device executing the software application) collects data from the application during one or more time periods within the session (e.g., in 10, 20, 30, 40, 50, or 60 second time period(s)), and uses the data collected in each time period to determine whether any of the event(s) occurred in the time period. When the system detects occurrence of an event in a time period, the system determines whether to trigger collection of session replay data for the session. When the system determines to trigger collection of session replay data for the session, the system transmits, to another system (e.g., session replay system server(s)), the session replay data for the session. For example, the system may transmit data associated with a sequence of visualizations rendered in a GUI of the software application during the session.

A system for generating session replays may generate the event configuration information used by a device to determine whether to collect session replay data for a session. The system may receive session replay data transmitted from a device after occurrence of an event indicated by the event configuration information (e.g., after detection of the event by the device). The system may: (1) store the session replay data; and (2) use the session replay data to generate a replay. In some embodiments, the system may generate the replay by determining a set of operations that replicate visualizations rendered in a GUI of the software application during the session. The set of operations may then be executed by a device displaying the session replay (e.g., using an Internet browser application).

The techniques described herein may be implemented in any of numerous ways, as the techniques are not limited to any particular manner of implementation. Examples of details of implementation are provided herein solely for illustrative purposes. The techniques disclosed herein may be used individually or in any suitable combination as aspects of the technology described herein are not limited to the use of any particular technique or combination of techniques.

FIG. 1A is a diagram of an environment in which some embodiments of the technology described herein may be implemented. FIG. 1A shows a session replay system 100 configured to communicate with devices 110 and a device 100. At a high level, the session replay system 100 captures and generates replays visualizations rendered in a GUI in sessions of a software application executed by computing devices 110. The device 120 may be used by a user to view a replay of a session of the software application. For example, the user may be a software developer, technical support expert, and/or product manager that may view one or more replays of application session(s) to diagnose an issue (e.g., application error, network connection, failed request, and/or other issue) that occurred during the session(s).

The session replay system 100 includes a data capture module 102, a replication module 104, a replication display module 106, an event configuration module 108, and a datastore 109 storing data associated with visualizations rendered in the GUI of the application executed by the device. In some embodiments, the session replay system 100 may comprise one or more servers for implementing modules of the system 100 and/or components thereof. In some embodiments, one or more modules of the mobile replay system 100 and/or components thereof may be executed by devices 110 and/or the computing device 120.

The data capture module 102 may obtain data from a device during a session of the software application being executed by the device. An application session may be a time period in which a user is interacting with the application (e.g., through a GUI displayed by the device). The session may be represented as a sequence of events representing the time period. The session may be delimited by certain events. For example, the start of the session may be when the application is launched, or otherwise used after a period of nonuse (e.g., 15 minutes, 30 minutes, 1 hour, 2 hours, or other suitable time period). As another example, the end of the session when the application is closed or after a threshold time period (e.g., 15 minutes, 30 minutes, 1 hour, 2 hours, or other suitable time period).

In some embodiments, one or more components of the data capture module 102 may be executed on a device. For example, a component of the data capture module 102 may obtain data from the software application executing on the device and transmit the data for storage in the datastore 109 of the session replay system 100. In some embodiments, the data capture module 102 may be executed separately from the device. For example, the data capture module 102 may be executed by one or more servers of the session replay system 100. In such embodiments, the data capture module 102 may communicate with the application to obtain data.

In some embodiments, the data capture module 102 may perform processing to determine whether to collect session replay data (e.g., data associated with a sequence of visualizations rendered in a GUI of the software application during a from a device. The data capture module 102 may access event configuration (e.g., stored on the device) indicating one or more events in which data for generation of a session replay is to be transmitted from the device (e.g., for storage and use in generation of a session replay). For example, the event configuration information may activate software instructions that monitor for detection of the event(s). As another example, the event configuration information may include code specifying condition(s) that define an event. In some embodiments, the data capture module 102 may access the event configuration information from memory of the device. For example, the event configuration information may have been transmitted by server(s) of the session replay system 100 to the device. In some embodiments, the data capture module 102 may access the event configuration information from outside the device. For example, the data capture module 102 may obtain the event configuration information from a remote storage storing the event configuration information.

In some embodiments, the event configuration information accessed by the data capture module 102 may configure the data capture module 102 to monitor for detection of the event(s). The data capture module 102 may monitor for occurrence of the event(s) by collecting data from the software application executing on the device. The data capture module 102 may collect data about various aspects of the software application. For example, the data capture module 102 may collect data about an application log, network requests (e.g., data transmission and receipt) of the software application, user interactions with the software application (e.g., through a GUI), a GUI of the software application and/or graphical elements therein, a length of an application session, and/or other aspects of the software application. In some embodiments, the data capture module 102 may monitor the software application by collecting data in multiple time periods within a session of the software application. The data capture module 102 may collect data from the software application in a time period and use the data collected during the time period to determine if any of the event(s) indicated by the event configuration information occurred during the time period. The data capture module 102 may collect data in 10, 20, 30, 40, 50, or 60 second time periods to determine if any of the event(s) occurred in the time periods.

In some embodiments, the data capture module 102 may use data collected during a time period of a session to detect occurrence of an event. The data capture module 102 may use the data collected during the time period to determine whether each of the event(s) occurred in the time period. The data capture module 102 may use the event configuration information to determine whether condition(s) defining each of the event(s) were met during the time period. The data capture module 102 may detect occurrence of an event when it determines, based on data collected during the time period, that condition(s) defining the event were met during the time period. For example, the data capture module 102 may determine that the length of the session has reached a threshold amount of time (e.g., 5 minutes, 10 minutes, 15 minutes, 20 minutes, 30 minutes, 45 minutes, 1 hour). As another example, the data capture module 102 may determine, using data collected during a time period, that the user performed a particular action. As another example, the data capture module 102 may determine, using data collected during a time period that the user reached a particular screen in the GUI of the software application (e.g., a transaction submission page, a transaction completion page, an error page). As another example, the data capture module 102 may determine that a particular log message appeared in an entry of an application log (e.g., indicating that a particular error occurred in the software application).

In some embodiments, the data capture module 102 may determine whether to trigger collection of session replay data (e.g., data associated with a sequence of visualizations rendered during a session) based on detecting occurrence of an event in a time period. In some embodiments, the data capture module 102 may determine whether to trigger collection of session replay data based on detecting occurrence of the event in the time period by triggering collection of session replay data in response to detecting the occurrence of the event. For example, the data capture module 102 may initiate transmission of session replay data for storage in response to detecting the occurrence of the event. In some embodiments, the data capture module 102 may perform additional processing after detecting occurrence of the event to determine whether to trigger collection of session replay data. For example, the data capture module 102 may determine whether to trigger collection of session replay data based on a target frequency at which to trigger collection of session replay data for the event across all sessions of the software application. The target frequency may be indicated by the event configuration information. Example techniques of determining whether to trigger collection of session replay data based on the target frequency are described herein.

In some embodiments, the data capture module 102 may collect session replay data from a device by accessing values from software objects used by the software application. For example, the data capture module 102 may obtain value(s) of one or more attributes from an instance of a software class in the application. The attribute value(s) may indicate visual characteristic(s) (e.g., color, shape, dimensions, rotation, font, font size, font formatting, and/or image) of graphical elements in the application GUI. For example, a software object (e.g., an instance of a software class) may represent the application GUI and/or a graphical element therein. The data capture module 102 may access attribute value(s) and changes therein from the software object and transmit the values for storage in the datastore 109. In some embodiments, the data capture module 102 may detect a change in an attribute value of a software object and capture data indicating the change (e.g., by obtaining attribute values before and after the change). For example, the data capture module 102 may detect a change by monitoring the software object for execution of one or more methods that result in attribute changes that cause rendering of a visualization in the application GUI. As another example, the software object may provide an indication of updates. The data capture module 102 may obtain data from the indications of updates provided by the software object.

In some embodiments, the application may be an iOS application that uses a view class (e.g., UIView, UIStackView, UIScrollView, UIImageView, UIProgressView, UICalendarView, etc.) and/or a view controller class (e.g., UIControl, Ufflutton, UIColorWell, UIDatePicker, UIPageControl, etc.) to render a visualization in a GUI of the application. The data capture module 102 may access attribute value(s) from a view class and/or a view controller class. The view and/or view controller class may provide functions to access variable values that are determinative of visualizations in the application GUI. In some embodiments, the data capture module 102 may detect when there is a change in a particular attribute, and obtain values of the particular variable before and after the change. In some embodiments, a data capture module 102 may monitor a class to detect changes in attribute values. For example, the data capture module 102 may monitor the class to detect changes by determining whether certain function(s) of the class have been executed to update attribute value(s).

In some embodiments, the data capture module 102 may collect session replay data by obtaining one or more images of a portion of an application GUI. The data capture module 102 may identify a location of an area of interest in the application GUI (e.g., an area including a graphical element that is updated as part of rendering a visualization in the application GUI). For example, the data capture module 102 may identify coordinates of a boundary of the area of interest. In some embodiments, the data capture module 102 may identify the location of a graphical element by obtaining information from a software object (e.g., an instance of a software class) indicating location information (e.g., coordinates) of a boundary of the graphical element. The data capture module 102 may then obtain an image of a portion of the application GUI using the location information. For example, the data capture module 102 may take a screen capture of the portion of the application GUI using the location information (e.g., by clipping to coordinates of a boundary of a graphical element).

In some embodiments, the data capture module 102 may collect session replay data by obtaining data indicative of one or more operations performed by the device in order to render one or more visualizations in an application GUI. The operation(s) may then be executed by the replication module 104. To illustrate, the application may use an application program interface (API) to render visualizations in an application GUI. For example, the application may be an ANDROID application that uses the canvas API to render visualizations in the application GUI (e.g., to draw shapes for the application GUI). The application may execute various methods (e.g., drawArc, drawBitmap, drawCircle, drawLine(s), drawOval, drawPaint, drawPicture, drawText, drawBitmapMesh, etc.) provided by the API in order to render visualizations. The data capture module 102 may obtain data indicating the executed methods (e.g., for use by the replication module 104 in replicating operations performed by the device).

Examples of data associated with a visualization rendered in an application GUI include data indicating location (e.g., coordinates) of a user touch interaction, image information, text information (e.g., color, font, size, etc.), color information, shadow information, line thickness information, tint information, position information, visibility information, opacity information, shape information, and/or other information. It should be appreciated that example data mentioned herein is for illustrative purposes. In some embodiments, the data capture module 102 may obtain data in addition to or instead of examples described herein.

The replication module 104 may use data obtained from a device by the data capture module 102 in order to generate a session replay by replicating the visualizations rendered in an application GUI by the device. Data obtained by the data capture module 102 may be stored in the datastore 109 of the session replay system 100. The replication module 104 may access the data from the datastore 109 to replicate the visualizations rendered in the application GUI.

In some embodiments, the replication module 104 may not use an operating system of the device. For example, the device may use an iOS operating system. As such, an application executed by the device may use software constructs (e.g., software classes) provided by the iOS system. The replication module 104 may not have access to these software constructs. The replication module 104 may replicate the visualizations using entirely different software constructs than those used by the application. For example, the replication module 104 may use a different software library to replicate visualizations than one used by the application. The software library may include different software classes than those used by the application (e.g., iOS provided software classes). As another example, the replication module 104 may replicate the visualizations rendered in an application GUI using a different operating system than one used by the application.

In some embodiments, the replication module 104 may replicate visualizations rendered in the application GUI by replicating the visualizations in a replay GUI. The replay GUI may represent the application GUI. A sequence of visualizations rendered in the application GUI may be replicated in the replay GUI to provide a replay of the sequence of visualizations to a user viewing the replay GUI. In some embodiments, the replay GUI may be a GUI of an Internet website that can be accessed by the device 120 using an Internet browser application.

In some embodiments, the replication module 104 may add visualizations as part of a sequence of replicated visualizations. The added visualizations may facilitate a viewing of a replay. In some embodiments, an added visualization may indicate a user action performed in the GUI. For example, the replication module 104 may add in visualizations that show a user selected a particular graphical element (e.g., a button). The replication module 104 may add a visualization that animates selection of the graphical element in the replay GUI. This may allow a user to recognize that a subsequent visualization occurred in response to selection of the graphical element.

In some embodiments, the replication module 104 may use a software object (e.g., an instance of a software class) representing a display of the device to replicate visualizations in a replay GUI. The replication module 104 may render visualizations in the replay GUI using functions provided by the software object. The replication module 104 may use the software object to perform various drawing operations to render visualizations in the GUI of the replay application that replicate the visualizations rendered in the application GUI.

In some embodiments, the replay application may use a canvas software class instance provided by the Skia graphics library as a representation of a screen of the device. The replay application may use the canvas instance to execute drawing operations that render visualizations in the replay GUI. The Canvas class may provide various drawing operations that can be performed to render visualizations in the replay GUI. For example, the replication module 104 may render visualizations by executing operations that result in drawing shapes, drawing curves, translating and/or rotating shapes, rendering text, shading, and/or generation of other visualizations in the replay GUI. Example visualizations described herein are for illustration of embodiments. Some embodiments may render visualizations instead of and/or in addition to example visualizations described herein.

In some embodiments, the replication module 104 may replicate a visualization rendered in an application GUI by determining one or more operations that replicate the visualization. The operation(s), when executed by a processor (e.g., of the session replay system 100 and/or the device 120), result in replicating the visualization in a replay GUI. The replication module 104 may use data captured by the data capture module 102 to determine the operation(s). In some embodiments, the replication module 104 may use data associated with the visualization rendered in the application GUI to determine a set of drawing operations that can be executed to replicate the visualization. For example, the replication module 104 may determine a set of drawing operations available through an instance of a canvas class that, when executed, replicate the visualization in the replay GUI. The replication module 104 may execute the set of operations to replicate the visualization. As an illustrative example, a visualization rendered in an application GUI may be a change in position of a shape displayed in the application GUI. The replication module 104 may: (1) access data indicating the change in the shape's position in the application GUI; (2) determine, using the data, a set of drawing operations to change the position of the shape in the replay GUI; and (3) execute the set of drawing operations to change the position of the shape in the replay GUI.

As described herein, in some embodiments, a visualization rendered in an application GUI may have been rendered using software constructs not available to the replication module 104 (e.g., because the visualization was rendered using a different operating system). The replication module 104 may thus translate visualizations rendered in the application GUI into operations that can be executed by the replay application. The replication module 104 may: (1) determine a change in a graphical element in the application GUI using data collected by the data capture module 102 (e.g., during a session in which the visualization was rendered); and (2) determine a set of drawing operations that can be executed by the replication module 104 (e.g., using software constructs available to the replay application) to render the change in the graphical element in a replication application GUI. The set of drawing operations determined by the replication module 104 may be different than those executed by the device because they utilize an entirely different set of software constructs (e.g., a different operating system and/or a different software framework) for rendering visualizations.

In some embodiments, a visualization rendered in an application GUI may have been rendered using software constructs that are available to the replication module 104. For example, the visualizations may have been rendered using an instance of a canvas class in ANDROID. The replication module 104 may use a software library (e.g., Skia) that provides access to the canvas class. The replication module 104 may replicate visualizations rendered in the application GUI by: (1) identifying a set of drawing operations performed by the device to render the visualization; and (2) executing the same set of drawing operations to replicate visualizations in a replay GUI. The replication module 104 may thus execute the same operations that were executed by the device to render the visualization in the replay GUI.

In some embodiments, the replication module 104 may replicate a visualization rendered in an application GUI by: (1) obtaining one or more images of a visualization; and (2) replicating the visualization by placing the image(s) in a replication application GUI. The replication module 104 may determine a location in the replication application GUI at which the place the image(s). In some embodiments, the replication module 104 may determine coordinates representing a portion of a screen at which to position the image(s). For example, the application GUI may include a graphical element represented by an iOS view class instance. The view class instance may provide coordinates of a boundary of the graphical element that are obtained by the data capture module 102. The replication module 104 may use the boundary coordinates to place, in a replay GUI, an image of the graphical element captured by the data capture module 102.

In some embodiments, location information obtained from the device (e.g., by the data capture module 102) may be in a different coordinate frame than one used by the replication module 104. For example, coordinates of a touch interaction in an application GUI obtained from the device may be provided in a coordinate frame of a screen of the device. The replication module 104 may use a coordinate frame of the application GUI, which may be different from the screen coordinate frame. For example, a 200×200 pixel screen may have a 600×600 scaled representation in a replay GUI. The replication module 104 may transform location information (e.g., coordinates) to the coordinate frame of the replication module 104 (e.g., which is the coordinate frame of the application GUI). The replication module 104 may transform the location information by: (1) determining a scaling ratio between the two coordinate frames; and (2) applying the scaling ratio to the location information to obtain the transformed location information. For example, the replication module 104 may use the scaling ratio to transform coordinates from a coordinate frame of the mobile device's 110 screen to coordinates of the replay GUI.

In some embodiments, the replication module 104 may determine a scaling ratio by obtaining the scaling ratio from the device. For example, the operating system (e.g., iOS) of the device may provide a scaling ratio between a coordinate frame of the application GUI and the coordinate frame of the screen of the device. A replay GUI may use the same coordinate frame as the application GUI, and thus the replication module 104 may use the scaling ratio provided by the operating system. In some embodiments, the replication module 104 may determine the scaling ratio by: (1) determining a size of a screen of the device; (2) determining a size of a coordinate frame of a replay GUI in which visualizations are replicated; and (3) determining the scaling ratio using the screen size and the size of the coordinate frame of the replay GUI.

In some embodiments, component(s) of the replication module 104 may be executed by the computing device 120.

The computing device 120 may execute operation(s) determined to replicate visualizations in a replay GUI (e.g., by rendering replicated visualizations in the replay GUI). For example, the replication module 104 may include a replay application executed on the computing device 120. Operations determined by the replication module 104 may be executed within the replay application. In some embodiments, component(s) of the replication module 104 may be executed separately from the computing device 120. For example, determination of operation(s) for replicating visualizations in a replay GUI may be performed by server(s) of the session replay system 100.

The replication display module 106 may provide a replay GUI on a display of the computing device 120. In some embodiments, the replication display module 106 may display the replay GUI in the display of the device 120 while a sequence of visualizations is being replicated in the GUI. A user of the device 120 viewing the display of the replay GUI generated by the replication display module 106 may view replication of a sequence of visualizations rendered in a GUI of an application executed by the device. Accordingly, the user may be able to view a replay of an application session.

In some embodiments, the replication display module 106 may generate a webpage of an Internet website and display a replay GUI in the webpage. For example, the webpage may be accessible by the device 120 using an Internet browser application. In some embodiments, the replication display module 106 may provide the replay GUI through an application executed by the device 120. For example, the application may be installed on the device 120. The replication display module 106 may display the replay GUI as part of an interface of the application.

In some embodiments, the replay GUI may provide a control interface that allows a user to navigate a sequence of replications replicated in the replay GUI. For example, the replication display module 106 may provide a play option, a forward option, a rewind option, and/or a draggable element that controls a position in a sequence of replicated visualizations. An example such an interface is described herein with reference to FIGS. 9A-9D.

The event configuration module 108 may generate event configuration information for use by the data capture module 102 to determine whether to collect session replay data for a session. In some embodiments, the event configuration module 108 may generate event configuration information based on input received from the device 120. For example, the event configuration module 108 may provide a GUI (e.g., in an Internet website) through which a user of the device 120 can provide input indicating one or more events in which to collect session replay data. The event configuration module 108 may generate the event configuration information based on the input received from the device 120. For example, the event configuration module 108 may generate instructions that, when executed by a device, cause the device to monitor for occurrence of the event(s). As another example, the event configuration module 108 may activate one or more functions as part of the software application that cause the device to monitor for occurrence of the event(s) (e.g., as part of executing the software application).

In some embodiments, the event configuration module 108 may receive, from the device 120, input specifying condition(s) defining an event. For example, the event configuration module 108 may receive code indicating the condition(s) defining the event. The event configuration module 108 may generate event configuration information that causes the device to monitor for occurrence of the event by monitoring for occurrence of the condition(s) defining the event. For example, the input may specify an event in which a particular webpage of an Internet website is reached. The event configuration module 108 may generate event configuration information that causes a device to monitor for user access of the particular webpage in a session.

In some embodiments, the event configuration module 108 may receive a specification of condition(s) defining an event as an argument to a tracking function. For example, the condition(s) may be specified as an argument to a tracking function. To illustrate, "Registered", "PurchaseComplete", "AddToCart", and/or "Search" may be input as the argument to the tracking function indicating custom events to be detected by the event detection component 102A. The tracking function may be executed to identify occurrence of an event indicated by the argument provided to the tracking function. The tracking function may automatically identify one or more conditions that indicate occurrence of the event. In some embodiments, the tracking function may receive additional argument(s) specifying one or more properties associated with the event. For example, the one or more properties may include a revenue, product category, product SKU, a Boolean value indicating whether a coupon was applied, one or more customer segments, a location, and/or other properties that may be associated with the event. Properties may be of type Boolean, integer, float, or string. The event configuration module 108 may generate event configuration information based on the condition(s) and properties such that the system 100 determines whether the condition(s) occurred with the specified properties to detect occurrence of an event.

In some embodiments, the event configuration module 108 may transmit event configuration information to the devices 110. The event configuration information may configure the devices 110 to monitor for event(s) indicated by the event configuration information. In some embodiments, the event configuration information may configure the devices 110 to monitor for occurrence of the event(s) as part of execution of the software application. The event configuration information may activate execution of instructions as part of executing the software application program. For example, the configuration information may activate certain instructions in a software library (e.g., provided by a software development kit (SDK)). The instructions, when executed by the device, cause the device to monitor for occurrence of the event(s). The instructions may further cause the device to perform a determination of whether to trigger collection of session replay data based on detecting occurrence of an event.

The datastore 109 may store collected session replay data. The session replay data may include data associated with visualizations rendered in a GUI of an application executed by the devices 110. The datastore 109 may store session replay data captured by the data capture module 102. In some embodiments, the datastore 109 may store attribute values of graphical elements from the application GUI obtained by the data capture module 102. In some embodiments, the datastore 109 may store data indicating operations performed by the device to render visualizations in the application GUI obtained by the data capture module 102. In some embodiments, the data store 109 may store images of the application GUI obtained by the data capture module 102.

In some embodiments, the datastore 109 may store records associated with respective sessions of the software application executed by the devices 110. Each record may store data for replicating a sequence of visualizations rendered in the application during a respective session. The record may be accessed by the session replay system 100 in order to replay a session (e.g., by replicating visualizations rendered from the session in a replay GUI displayed by the device 120). For example, in response to a request from the device 120 to view a replay of a session of an application executed by the device, the session replay system 100 may provide a record associated with the session to the device 120 to allow the device 120 to execute operations to replicate a sequence of visualizations rendered in an application GUI during the session (e.g., using an Internet browser application of the device 120). As another example, in response to a request from the device 120 to view a replay of a session of an application executed by the device, the session replay system 100 may access a record associated with the session and replicate a sequence of visualizations from an application GUI in a replay GUI provided to the device 120.

In some embodiments, the datastore 109 may comprise of storage hardware. For example, the datastore 109 may comprise one or more hard disk drives, solid state drives, and/or other storage hardware. In some embodiments, the datastore 109 may comprise cloud based storage. The cloud based storage may comprise of storage hardware in one or more locations remote from other module(s) of the session replay system 100. The storage hardware may be accessed through a network (e.g., the Internet). Some embodiments may use other forms of storage in addition to and/or instead of those described herein as the storage 108 of the session replay system 100.

In some embodiments, the devices 110 may include any number of computing devices that can access the software application. For example, the devices 110 may include one or more mobile devices such as a smartphone(s), one or more smartwatches, an e-reader, a handheld gaming console, or other mobile device. As another example, the devices 110 may include desktop computer(s) and/or other computing device(s).

The computing device 120 may be any suitable computing device. For example, the computing device 120 may be a desktop computer, or a mobile device. In some embodiments, the device 120 may be any device that can execute an Internet browser application (e.g., to access a website in which application session replays are displayed).

Figure 1B:
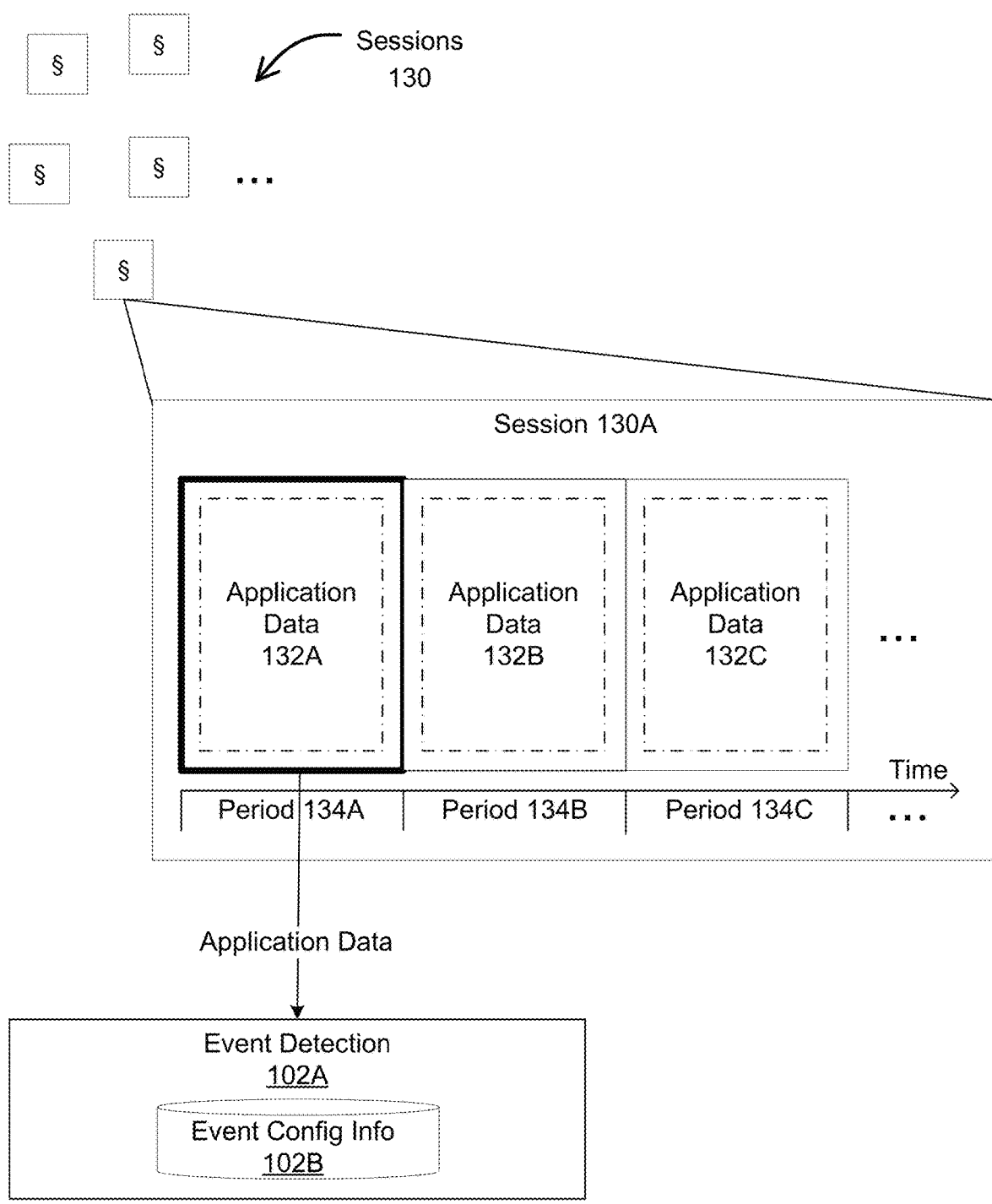
FIG. 1B illustrates monitoring performed during a session of a software application to detect occurrence of an event, according to some embodiments of the technology described herein.

FIG. 1B illustrates monitoring performed by an event detection component 102A of the data capture module 102 to detect occurrence of an event, according to some embodiments of the technology described herein. As shown in FIG. 1B, there may be multiple sessions 130 of the software application being executed by multiple ones of the devices 110.

Session 130A may be one of the sessions being monitored by the event detection component 102A for occurrence of event(s). As the session 130A proceeds over time, there may be a sequence of processing performed by the software application. The event detection component 102A may obtain data from the software application as it is being executed during the session 130A. The event detection component 102A obtains data over time periods within the session 130A. In the example of FIG. 1B, the event detection component 102A has obtained application data 132A in the time period 134A. The event detection component 102A may subsequently obtain application data 132B in time period 134B, and obtain application data 132C in time period 134C.

As shown in FIG. 1B, the event detection component 102A includes event configuration information 102B (e.g., provided by the event configuration module 108). The event configuration information 102B may indicate the event(s) in which to trigger collection of session replay data from the device executing the session 130A. For each time period, the event detection component 102A may obtain data that allows the event detection component 102A to detect occurrence of event(s) indicated by the event configuration information 102B. The application data obtained by the event detection component 102A depends on which event(s) the event detection component 102A is to monitor for occurrence of.

The event detection component 102A may be configured to detect various types of events. In some embodiments of the event detection component 102A may be configured to determine whether a length of a session has reached a threshold amount of time (e.g., 5 minutes, minutes, 15 minutes, 20 minutes, 30 minutes, 45 minutes, 1 hour, 2 hours, and/or another threshold amount of time). In some embodiments, the event detection component 102A may determine whether a particular portion of a GUI has been accessed. For example, the event detection component 102A may determine whether a particular webpage of a website has been accessed. As another example, the event detection component 102A may determine whether a particular screen of a mobile application has been accessed. In some embodiments, the event detection component 102A may determine whether a user has interacted with a particular graphical element (e.g., a button, menu item, text input interface, or other interactive graphical element) in a GUI of the software application. In some embodiments, the event detection component 102A may determine a particular network request or response as an event. For example, the event detection component 102A may determine whether a network communication error occurred (e.g., a requested transmission by the software application failed, and/or receipt of data through a network failed). As another example, the event detection component 102A may determine whether a request URL was accessed by the software application. As another example, the event detection component 102A may determine whether a request method (e.g., GET, POST) was executed by the software application. As another example, the event detection component 102A may determine receipt of a particular response status code (e.g., 0 for failure, 200 for success, and/or other codes). As another example, the event detection component 102A may determine whether a network request lasts more than a threshold amount of time (e.g., 1 seconds, 2 seconds, 3 seconds, 4 seconds, 5 seconds, 10 seconds, and/or another time). As another example, the event detection component 102A may determine whether a network request text or response text (e.g., in the response body) matches a text condition (e.g., "contains 'error'"). In some embodiments, the event detection component 102A may determine whether a particular log message is present in an application log. For example, the event detection component 102A may determine whether a particular application error message appeared in the log. In some embodiments, the event detection component 102A may determine whether a particular graphical element has appeared in a GUI of the software application.

In some embodiments, the event detection component 102A may detect occurrences of events defined by a user (e.g., of device 120). Such an event may also be referred to as a "custom event". The event detection component 102A may receive a specification of one or more conditions that define a custom event. The event detection component 102A may determine whether the condition(s) are met to detect occurrence of the custom event. As an illustrative example, the event configuration information may define an event as being when a user has reached a completed transaction (e.g., purchase) page of a website or screen of a mobile application. The event detection component 102A may monitor for occurrence of the event by determining whether the page or screen has been accessed. As another example, the event configuration information may define an event to be when a particular data conversion (e.g., purchase, add item to cart, perform a search, and/or other data conversion) occurs in a session of the application.

In some embodiments, the event detection component 102A may provide a custom event filter that can be used to access sessions in which custom event(s) were determined to have occurred. For example, the event detection component 102A may provide a custom event filter interface through which a user may access sessions containing custom event(s).

The event detection component 102A may obtain various different types of data. In some embodiments, the event detection component 102A may obtain data indicating time allotted since the start of the session when the event detection component 102A is to monitor for whether the session length has reached a threshold amount of time. In some embodiments, the event detection component 102A may obtain data indicating graphical elements that have appeared in the GUI during a time period (e.g., data from software objects representing the graphical elements) when the event detection component 102A is to monitor for whether a particular graphical component (e.g., a button) has appeared in a GUI of the software application. As another example, the event detection component 102A may obtain data identifying GUI portion(s) accessed by the user in the time period when the event detection component 102A is to monitor for whether a user has accessed a particular portion of the GUI (e.g., a particular webpage of an Internet website). As another example, the event detection component 102A may obtain data indicative of interactions with the graphical element (e.g., using a software object representing the graphical element) when the event detection component 102A is to monitor for whether a user interacted with a particular graphical element in the GUI. As another example, the event detection component 102A may obtain a listing of log entries from the time period when the event detection component 102A is to monitor for a particular log message. As another example, the event detection component 102A may obtain data indicating a response to network request(s) of the software application the event detection component 102A is to monitor for a network communication error.

The event detection component 102A may obtain data from the device in various ways. In some embodiments, the event detection component 102A may use software constructs of the software application to obtain data. For example, the event detection component 102A may execute methods provided by software classes of the software application to obtain data (e.g., about a GUI of the software application and/or elements therein). In some embodiments, the event detection component 102A may obtain listings from a log of the application. In some embodiments, the event detection component 102A may obtain time data from the software application. The event detection component 102A may use the time data for determining how long the session 130A has been running. In some embodiments, the event detection component 102A may obtain information about network communication requests and responses to the requests. For example, the event detection component 102A may capture messages exchanged with a network interface device of the device executing the session 130A of the software application.

In the example of FIG. 1B, the event detection component 102A obtains application data for the time period 134A, but does not detect occurrence of any of the event(s) indicated by the event configuration information 102B. As such, session replay data is not collected by the data capture module 102 based on the application data obtained from time period 134A. In this example, the event detection component 102A may suppress transmission of session replay data (e.g., to server(s) of the session replay system 100 for storage and generation of a replay).

Figure 1C:
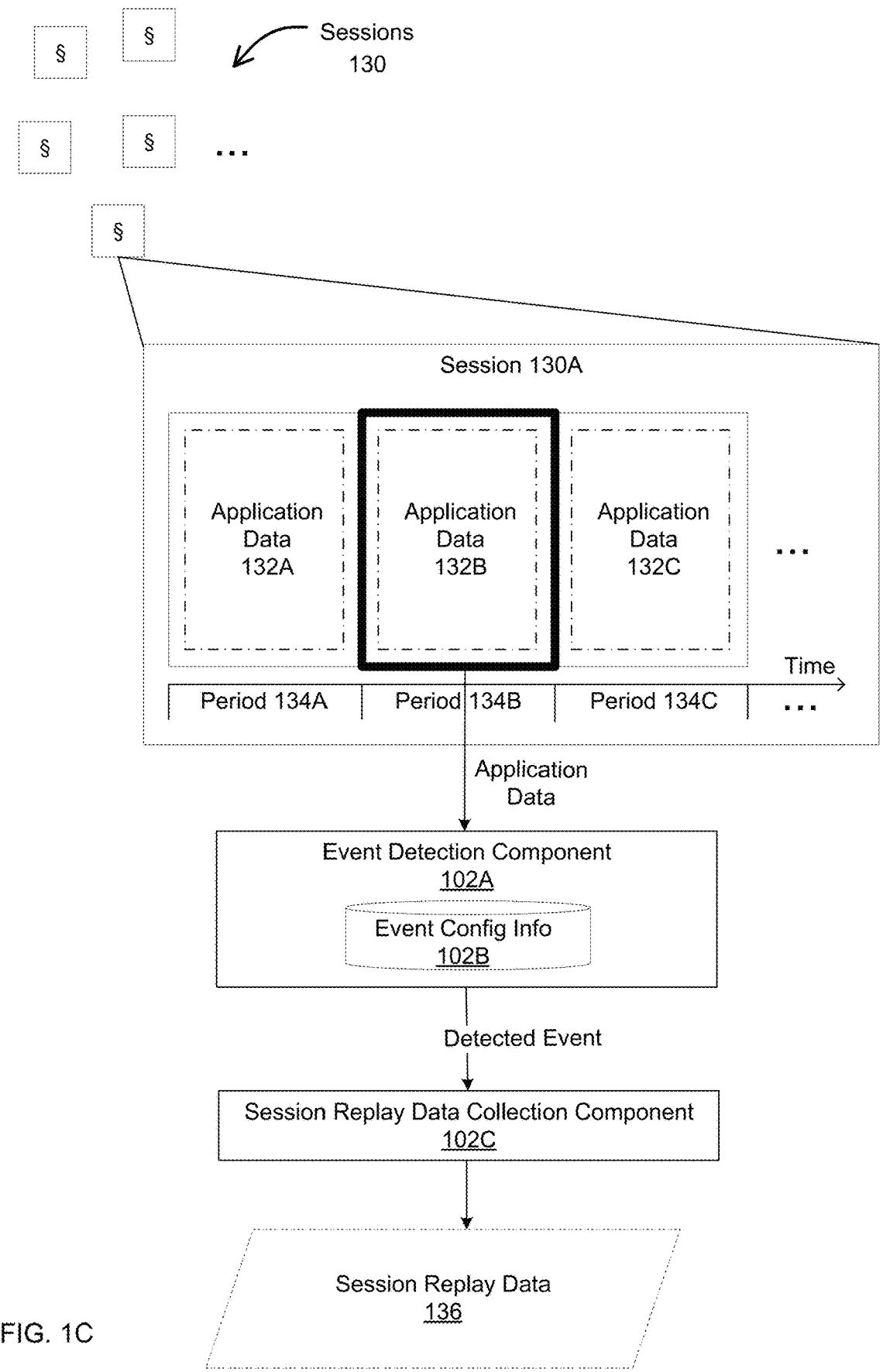
FIG. 1C illustrates triggering collection of session replay data after detecting occurrence of an event during a session, according to some embodiments of the technology described herein.

FIG. 1C illustrates triggering collection of session replay data after detecting occurrence of an event during a session, according to some embodiments of the technology described herein. In the example of FIG. 1C, the event detection module 102A obtains application data during a time period 134B subsequent to the time period 134A. The event detection component 102A detects, using the application data, occurrence of one of the event(s) indicated by the event configuration information 102B. The event detection component 102A transmits an indication of the detected event to a session replay data collection component 102C of the data capture module 102. The session replay data collection component 102C then collects session replay data 136 (e.g., as described herein with reference to the data capture module 102 of FIG. 1A). The session replay data collection component 102C may transmit the session replay data 136 for storage (e.g., in datastore 109) and use in generation of a replay of the session 130A.

Figure 2:
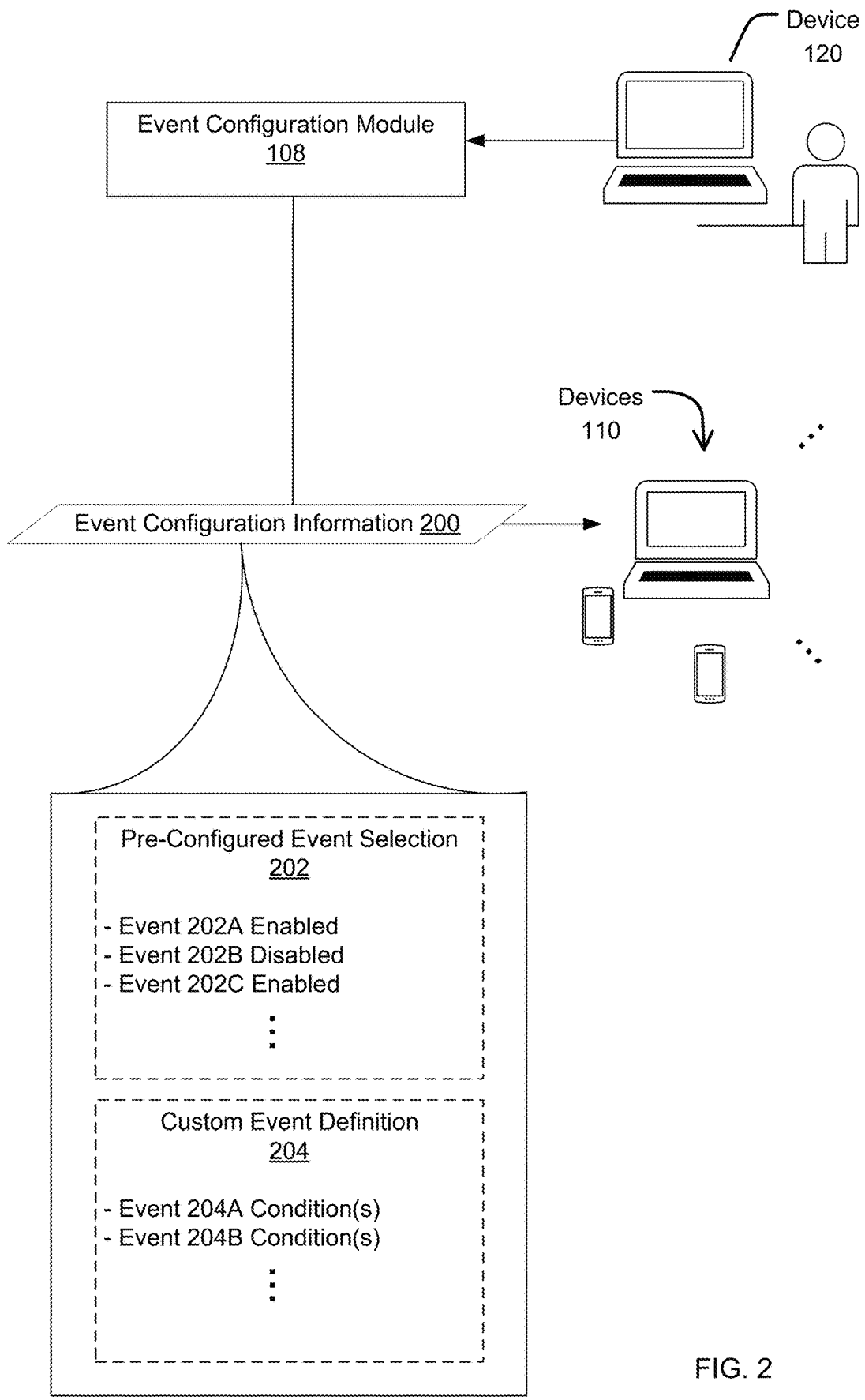
FIG. 2 illustrates generation and transmission of even configuration data to devices, according to some embodiments of the technology described herein.

FIG. 2 illustrates generation and transmission of event configuration information to devices by the event configuration module 108 of the session replay system 100 (described herein with reference to FIGS. 1A-1C), according to some embodiments of the technology described herein. As shown in FIG. 2, the event configuration module 108 interacts with the device 120 to obtain user input indicating event(s) in which to trigger collection of session replay data for a session of a software application. The event configuration module 108 generates the event configuration information 200 based on user input and transmits it to the devices 110. The event configuration information 200 may be used (e.g., by the event detection component 102A of the data capture module 102) to detect occurrence of the event(s) during sessions of the software application.

In some embodiments, the event configuration information 200 may configure the devices 110 to monitor for the event(s). The event configuration information 200 may enable execution of software code that, when executed, performs functions to determine whether the event(s) have occurred. The functions may use data obtained from the software application to determine whether any of the event(s) occurred. In some embodiments, the event configuration information 200 may enable and/or disable monitoring for various events by the event detection component 102A. In some embodiments, the event configuration information 200 may include a specification of one or more conditions associated with an event that the event detection component 102A uses to perform monitoring. The event detection component 102A may determine, using data obtained from the software application, whether the condition(s) are met to determine whether the event occurred.

As shown in FIG. 2, the event configuration information 200 may include a selection 202 of pre-configured events. The selection 202 of pre-configured events may indicate a selection of event(s) from a set of events that are pre-configured for monitoring. For example, the software application may include instructions that, when executed, perform monitoring of the set of events. The selection 202 may enable and/or disable monitoring for the set of events. In the example of FIG. 2, the pre-configured event selection 202 enables monitoring of events 202A, 202C and disables monitoring for event 202B. In this example, the event detection component 102A may thus monitor for occurrence of events 202A, 202C and not for occurrence of event 202B.

The event configuration information 200 may include a custom event definition 204. The custom event definition may define one or more events. The custom event definition 204 may include, for each custom event, a set of condition(s) specifying the event. The example of FIG. 2 includes condition(s) for a custom even 204A, and condition(s) for custom even 204B. The condition(s) 204A, 204B may be used by the event detection module 102A to monitor for occurrence of the custom event(s). For example, the condition(s) may be used by a function executed with the software application that determines whether the condition(s) are met using data collected from the software application program.

In some embodiments, the event configuration information 200 may include the pre-configured event selection 202 and/or custom event definition 204. In some cases, the event configuration information 200 may include only pre-configured event selection 202. In some cases, the event configuration information 200 may include only custom definition 204. In some cases, the event configuration information 200 may include both the pre-configured event selection 202 and the custom event definition 204.

Figure 3A:
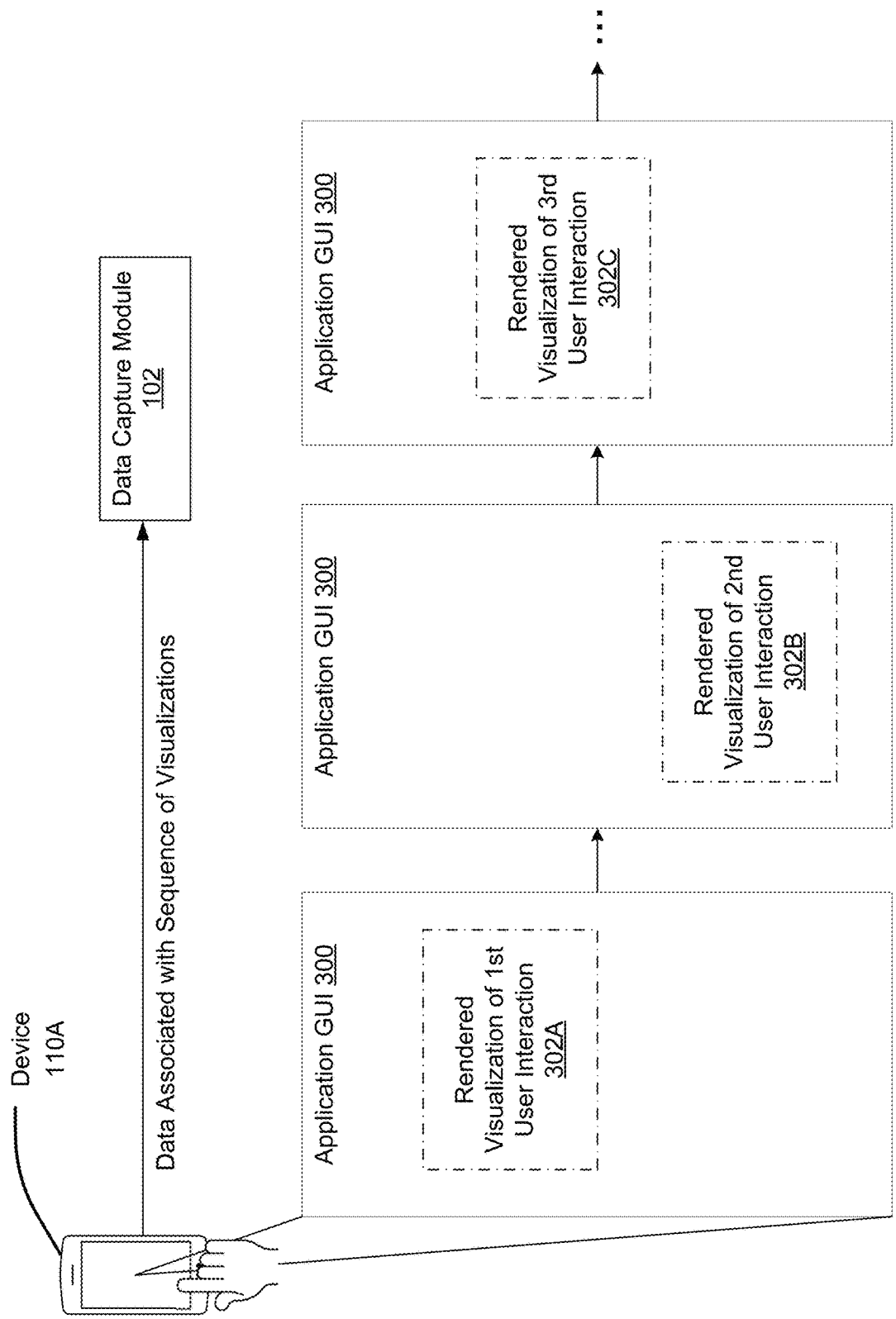
FIG. 3A illustrates capture of session replay data for a session of a software application, according to some embodiments of the technology described herein.

FIG. 3A illustrates capture of session replay data from a device 110A according to some embodiments of the technology described herein. The session replay data includes data associated with a sequence of visualizations rendered in a GUI 300 of a software application executed by the device 110A. The sequence of visualizations may be rendered during a session in which a user is interacting with the application through the GUI. The capturing of session replay data illustrated by FIG. 3A may be performed after a determination to collect session replay data (e.g., based on detecting occurrence of event(s)).

In the example of FIG. 3A, a user is using the application GUI 300 to interact with the application. For example, the device 110A may be a smartphone in which a user is interacting with the application GUI 300 with touch interactions (e.g., tap, drag, pinch, etc.) on a touch screen. A sequence of user interactions may result in a sequence of visualizations 302A, 302B, 302C rendered in the application GUI during a session. For example, the sequence of visualizations may include changes to graphical elements displayed in the application GUI such as changes in color, text, shape, dimensions, orientation and/or other changes. As shown in FIG. 3A, the data capture module 102 of the session replay system 100 obtains data associated with the sequence of visualizations 302A, 302B, 302C rendered in the application GUI 300.

The data capture module 102 may obtain data associated with the visualizations and transmit the data for storage in the datastore 109 of the session replay system 100 (e.g., to replicate the sequence of visualizations by the replication module 104). In some embodiments, the data capture module 102 may store the data associated with the sequence of visualizations 302A, 302B, 302C in a record associated with a session in which the sequence of visualizations 302A, 302B, 302C was rendered. The record may subsequently be accessed by the replication module 104 of the session replay system 100.

Figure 3B:
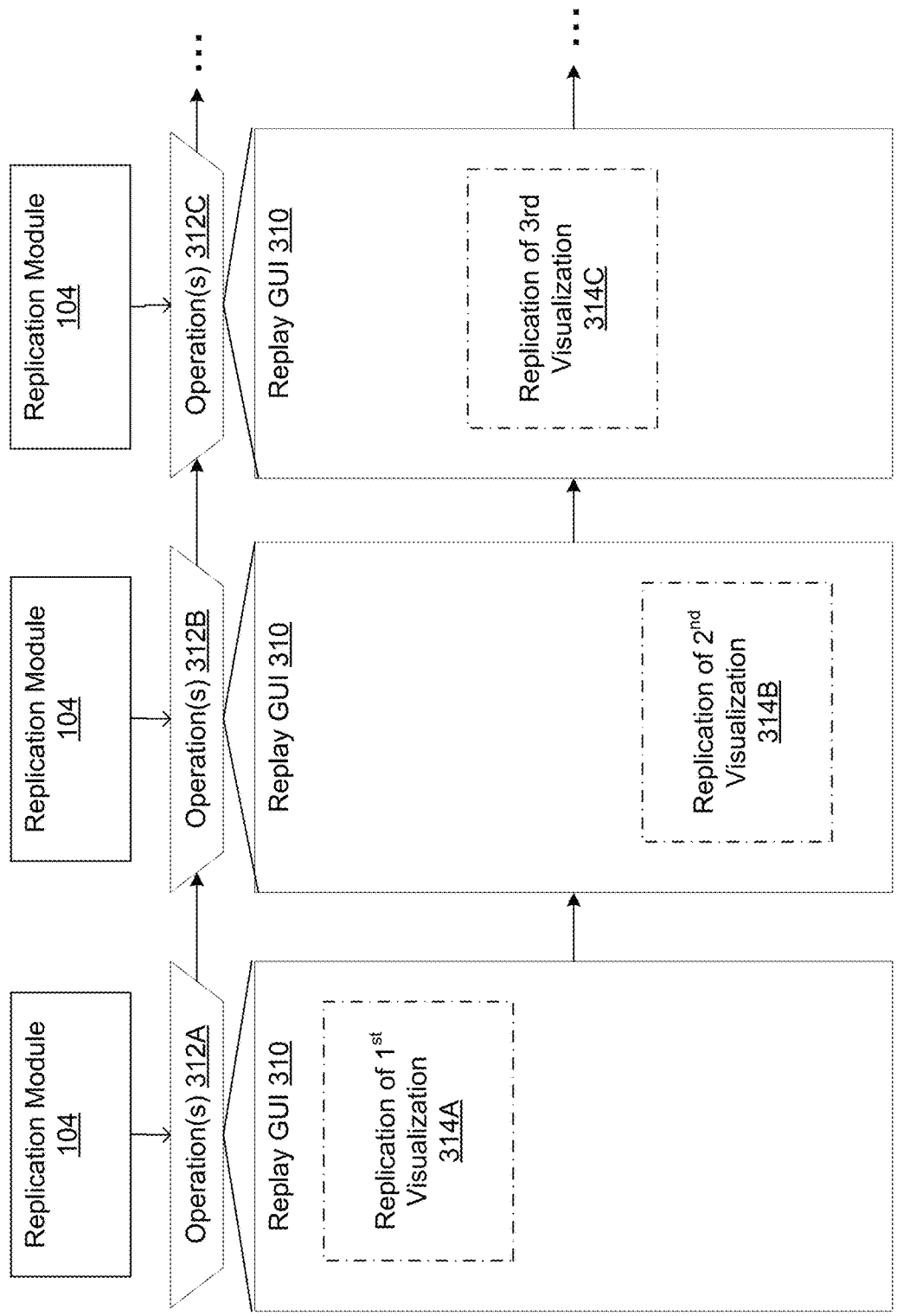
FIG. 3B illustrates replication of a sequence of visualizations rendered during the software application session of FIG. 3A, according to some embodiments of the technology described herein.

FIG. 3B illustrates replication of the sequence of visualizations 302A, 302B, 302C rendered in the software application session of FIG. 3A, according to some embodiments of the technology described herein. The replication module 104 may use the data associated with the sequence of visualizations 302A, 302B, 302C captured by the data capture module 102 to replicate the sequence of visualizations 302A, 302B, 302C in a replay GUI.

As shown in FIG. 3B, the replication module 104 executes a sequence of sets of operations 312A, 312B, 312C. Each set of operations may be determined and performed by the replication module 104 to replicate a respective one of the sequence of visualizations 302A, 302B, 302C in the replay GUI 310. In the example of FIG. 3B, the set of operations 312A is executed by the replication module 104 to generate a replication 314A of the first visualization 302A, the set of operations 312B is executed by the replication module 104 to generate a replication of 314B of the second visualization 302B, and the set of operations 312C is executed by the replication module 104 to generate a replication 314C of the third visualization 302C.

Example operations that may be determined and executed by the replication module 104 are described herein with reference to FIG. 1A. For example, a set of operations may include one or more drawing operations determined by the replication module 104 to replicate a visualization rendered in the application GUI 300. As another example, a set of operations may include one or more operations that were executed by the device to render a respective visualization which the replication module 104 may now execute to replicate the visualization. As another example, a set of operations may include positioning, in the replay GUI 310, one or more images of a visualization captured by the data capture module 102.

Figure 4:
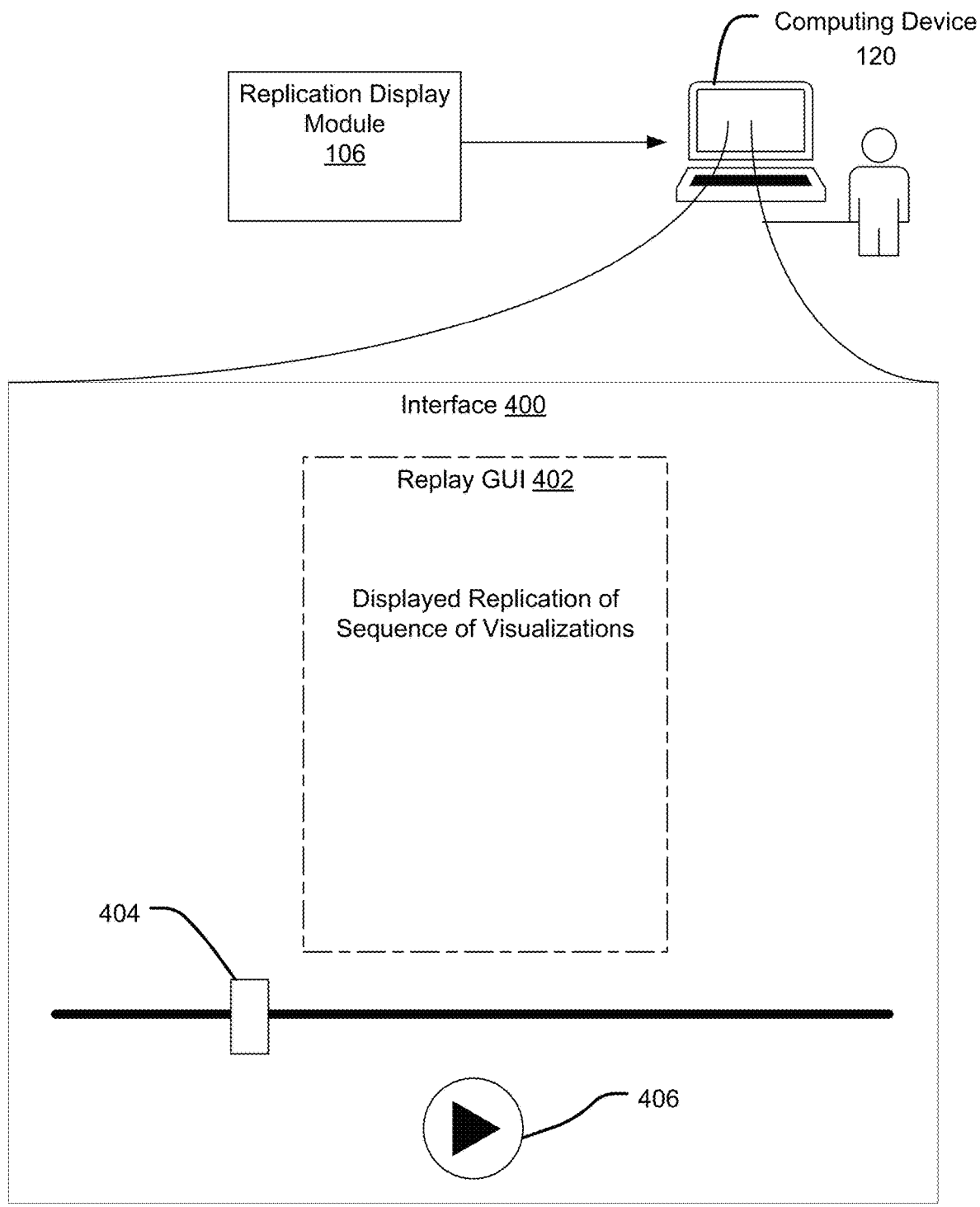
FIG. 4 illustrates an example replay GUI, according to some embodiments of the technology described herein.

FIG. 4 illustrates an example replay GUI 402, according to some embodiments of the technology described herein. As shown in FIG. 4, the replication display module 106 of the session replay system 100 may provide an interface 400 displaying the replay GUI 402 in which a sequence of visualizations rendered in a software application GUI may be replicated by the replication module 104.

As shown in FIG. 4, the interface 400 provided by the replication display module 106 includes a display of the replay GUI 402. The replications of the sequence of visualizations rendered in the replay GUI 402 may be viewed through the interface 400. In the example of FIG. 4, the interface 400 includes playback control features that allow a user to control replication in the replay GUI 402. The interface 400 includes a play/pause button 406 that may be used to play/pause replication. The interface 400 further includes an element 404 that can be used to navigate through a sequence of visualization replications.

In some embodiments, the interface 400 provided by the replication display module 106 may be a GUI shown in a webpage in an Internet website that can be accessed by the computing device 120 using an Internet browser application. In some embodiments, the interface 400 provided by the replication display module 106 may be a GUI of an application installed on the computing device 120. In some embodiments, operations for replication of visualizations may be executed by server(s) of the session replay system 100, and the replication may be displayed on the device 120 in interface 402. In some embodiments, the operations may be executed by the computing device 120 to display the replications in the replay GUI 402 shown in the interface 400.

Figure 5A:
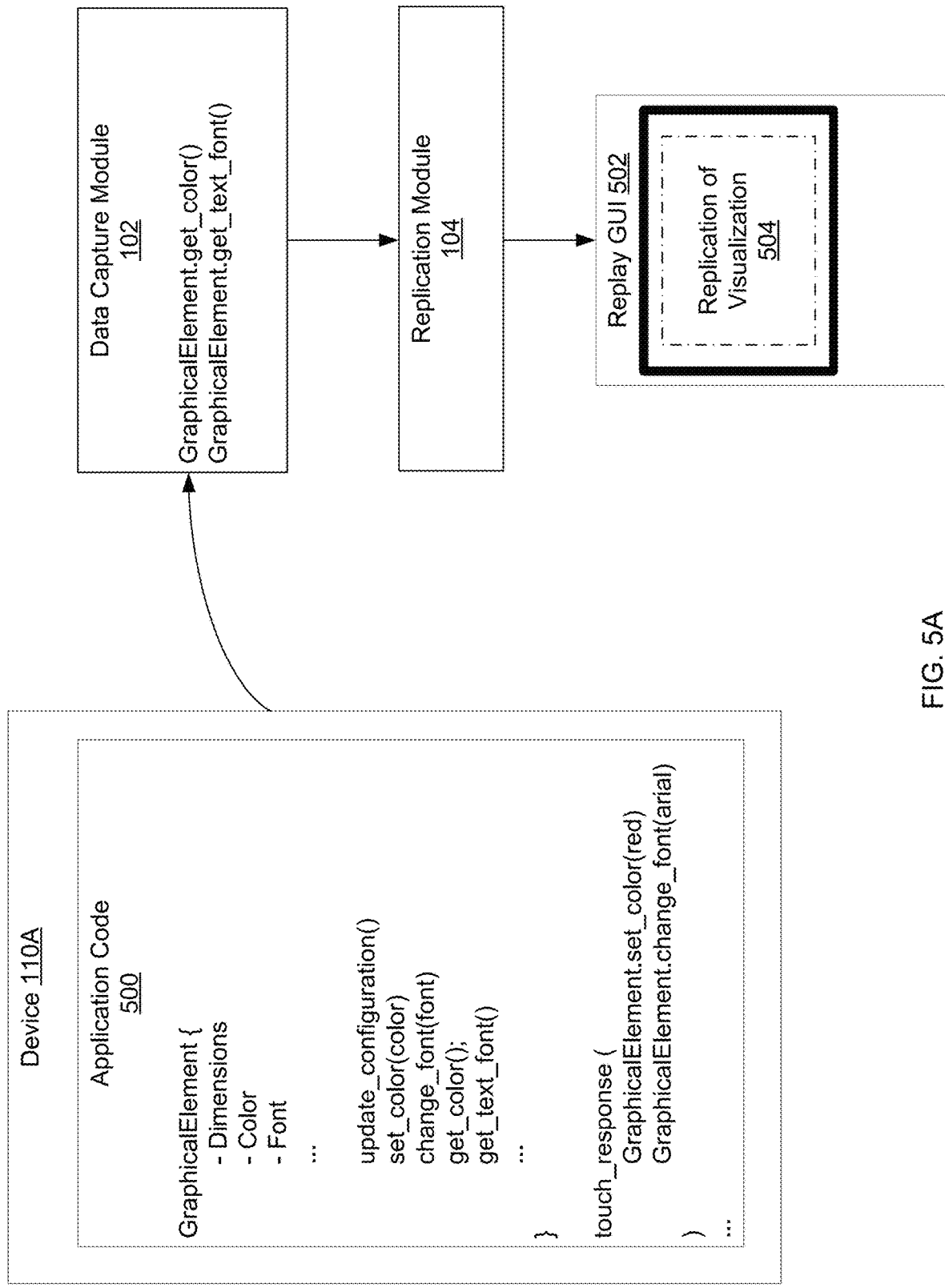
FIG. 5A illustrates an example of replicating a visualization rendered in a GUI of a software application, according to some embodiments of the technology described herein.

FIG. 5A illustrates an example of capturing data associated with a visualization rendered in a GUI of software application, according to some embodiments of the technology described herein.

FIG. 5A shows application code 500 of the application being executed by a device 110A. The application code 500 includes a software object "GraphicalElement" representing a graphical element in the application GUI. For example, the software object may be an instance of a class (e.g., an iOS view or view controller class) representing the graphical element. The software object includes attributes (e.g., properties) that determine appearance of the graphical element and methods for modifying the appearance. For example, the properties include dimensions, color, and font. Property values may be accessed using methods provided by the software object. For example, a "get_color( )" method may be used to access a current color of the graphical element and the "get_text_font( )" method may be used to access a current font of text of the graphical element. The methods include a "set_color(color)" method for changing a color of the graphical element and a "change_font(font)" method for modifying a font of the text of the graphical element.

In the example of FIG. 5A, the application code 500 includes a function "touch_response" that updates a color of the graphical element to red, and changes the text font to the arial font in response to the graphical element being touched in a touch screen (e.g., of a smartphone). The function may be executed in response to detection of a touch interaction with the graphical element. As shown in the example embodiment of FIG. 5A, the data capture module 102 may access data associated with a modification of the graphical element rendered in the application GUI by accessing information from the software object. The data capture module 102 executes methods provided by the software object to obtain information about visual attributes of the graphical element. The data capture module 102 may execute the "get_color( )" and "get_text_font( )" functions provided by the software object to obtain an updated color and textual font of the graphical element. The data indicating the changed color and font obtained from executing these functions may be data associated with the rendered visualization of the change in the graphical element that is obtained by the data capture module 102.

As shown in FIG. 5A, the replication module 104 may use the data associated with the visualization rendered in the application GUI to replicate the visualization in the replay GUI 502. The replay GUI 502 may be displayed as part of an interface (e.g., as described herein with reference to FIG. 4).

In some embodiments, the replication module 104 may determine a set of one or more operations that, when executed, replicate the updating of the color and font of the graphical element in the application GUI. The replication module 104 may identify a set of operation(s) available in a software library (e.g., Skia) that replicate the visualization from the application GUI. The replication module 104 may then execute the set of operation(s) to generate the replication 504 in the replay GUI 502.

In some embodiments, instead of obtaining updated visual attributes of the graphical element as illustrated in the example of FIG. 5A, the data capture module 102 may obtain data indicating a set of operations performed by the device to render a visualization. For example, the data capture module 102 may obtain data indicating operation(s) performed in an ANDROID application using an instance of a canvas class. The replication module 104 may be able to access a software construct (e.g., a software class) used to render the visualization (e.g., because the replication module 104 has access to a software library that was also used by the application). The replication module 104 may then replicate the visualization by executing the same operation(s). For example, the replication module 104 may use an instance of the canvas class to execute the same operations and thus replicate the visualization in a replay GUI.

Figure 5B:
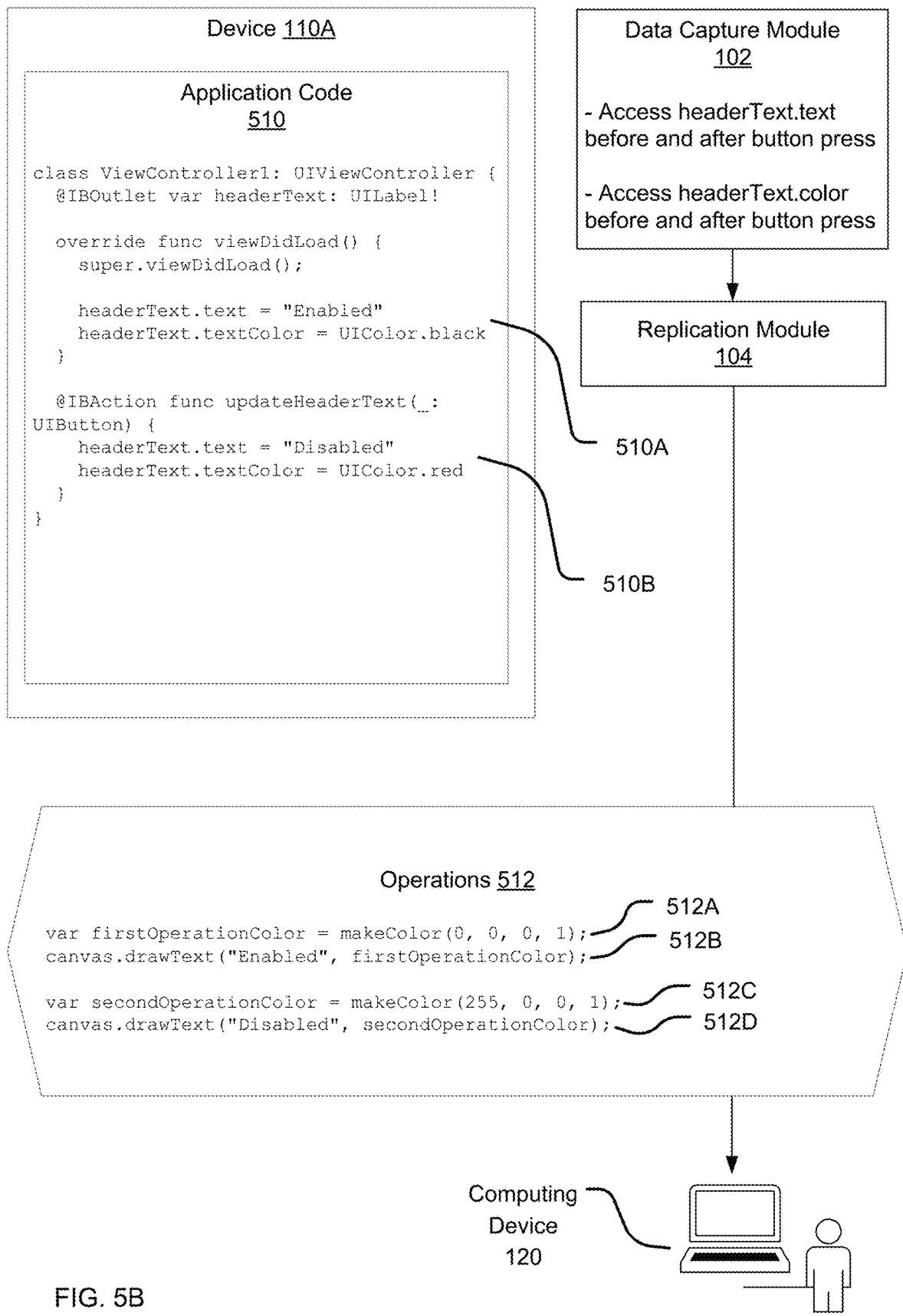
FIG. 5B illustrates another example of replicating a visualization rendered in an application of a GUI, according to some embodiments of the technology described herein.

FIG. 5B illustrates another example of capturing data associated with a visualization rendered in a GUI of a software application, according to some embodiments of the technology described herein.

In the example of FIG. 5B, the device is using iOS. The application code 510 includes code that utilizes iOS view and view controller classes to render visualizations in a GUI of the application. In this example, the application code 510 includes a section 510A that sets an initial text of a label in the GUI to "Enabled", and the text's color to black. The application code 510 includes a section 510B that specifies a visualization to be rendered in the GUI of the application in response to selection of a button in the GUI. The code in the section 510B causes the label text to change to "Disabled" and the text color to change to red in response to selection of the button in the GUI.

As shown in the example of FIG. 5B, the data capture module 102 may capture data associated with a visualization rendered in the application GUI in response to selection of the button. The data capture module 102 may capture the label's text in the GUI (i.e., "headerText.text") and the text's color (i.e., "headerText.color"). For example, the data capture module 102 may access the data using methods provided by the UILabel class to read values of the "text" and "textColor" properties in the "headerText" instance of the class.

The replication module 104 may use the data captured by the data capture module 102 to determine a set of operations 512 to replicate the visualization rendered in the application GUI of the device in response to selection of the button. The set of operations 212 includes operations 512A, 512B that generate a visualization of the application GUI prior to pushing of the button. The operation 512A defines a black color. Operation 512B sets, in a canvas class representing a replication GUI: (1) text representing the label from the application GUI to "Enabled"; and (2) the color of the text to the black color defined in operation 512A. The set of operations 512 includes operations 512C, 512D that generate a visualization of the application GUI after pushing of the button (i.e., after the label text and color were updated by the device). The operation 512C defines a red color. The operation 512D sets, in the canvas class representing the replay GUI: (1) the text representing the label from the application GUI to "Disabled"; and (2) the color of the text to the red color defined in operation 512C.

As shown in FIG. 5B, the operations 512 may be sent to the computing device 120 for execution. When the computing device 120 executes the operations 512, the computing device 120 may replicate, in a replay GUI, the visualization of the change in label text and color from the application GUI. For example, execution of the operations 512 may cause the computing device 120 to render a replicated visualization in the replay GUI.

Figure 6:
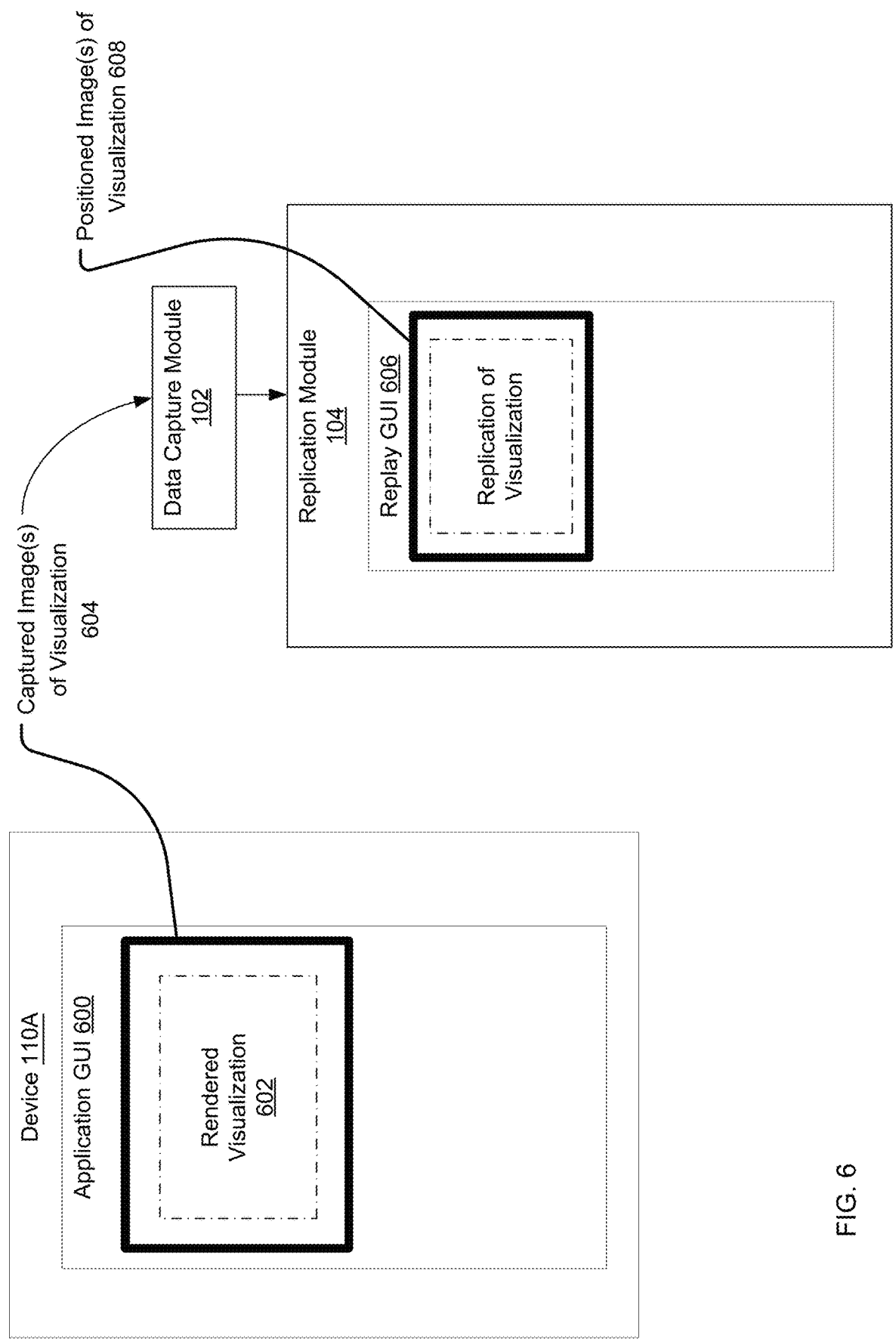
FIG. 6 illustrates an example of capturing image(s) of a visualization rendered in a GUI of a software application and use of the image in replicating the visualization, according to some embodiments of the technology described herein.

FIG. 6 illustrates an example of capturing image(s) of a visualization rendered in a GUI of a software application executed by a device 110A and use of the image(s) in replicating the visualization, according to some embodiments of the technology described herein.

As shown in FIG. 6, the application GUI 600 displays a rendered visualization 602 within the GUI 600. The data capture module 102 captures one or more images 604 of the rendered visualization 602 in the application GUI 600. The data capture module 102 may store the images in the datastore 109 of the session replay system 100. The replication module 104 may use the images to replicate the visualization 602 in the replay GUI 606. As shown in FIG. 6, the replication module 104 positions the image(s) 604 of the visualization obtained by the data capture module 102 in the replay GUI 606 to provide a replication 608 of the visualization 602 rendered in the application GUI 600 of the device.

In some embodiments, the data capture module 102 may capture image(s) of the rendered visualization 602 by: (1) identifying a portion of the application GUI 600 in which the visualization 602 was rendered; and (2) capturing image(s) of the identified portion as the image(s) 604. The data capture module 102 may identify coordinates of a boundary of the portion of the application GUI 600. For example, the data capture module 102 may identify boundaries of a graphical element that was modified as part of the rendered visualization 602. The data capture module 102 may obtain image(s) of the graphical element using the identified boundaries.

In some embodiments, the data capture module 102 may identify a portion of the application GUI 600 in which the visualization 602 is rendered using data obtained from a software object (e.g., an instance of a software class) representing a graphical element of the GUI 600. The software object may include a method that allows the data capture module 102 to access information indicating a location of the graphical element represented by the software object. For example, the software object may include a method providing coordinates of a boundary of the graphical element in the application GUI 600. The data capture module 102 may capture image(s) of a portion of the application GUI 600 enclosed by the boundary. For example, the data capture module 102 may clip to the portion of the application GUI 600. As another example, the software object may include a method that, when executed, returns an image of the graphical element represented by the software object. The data capture module 102 may execute the method to obtain the image(s) 604 of the rendered visualization 602.

Figure 7A:
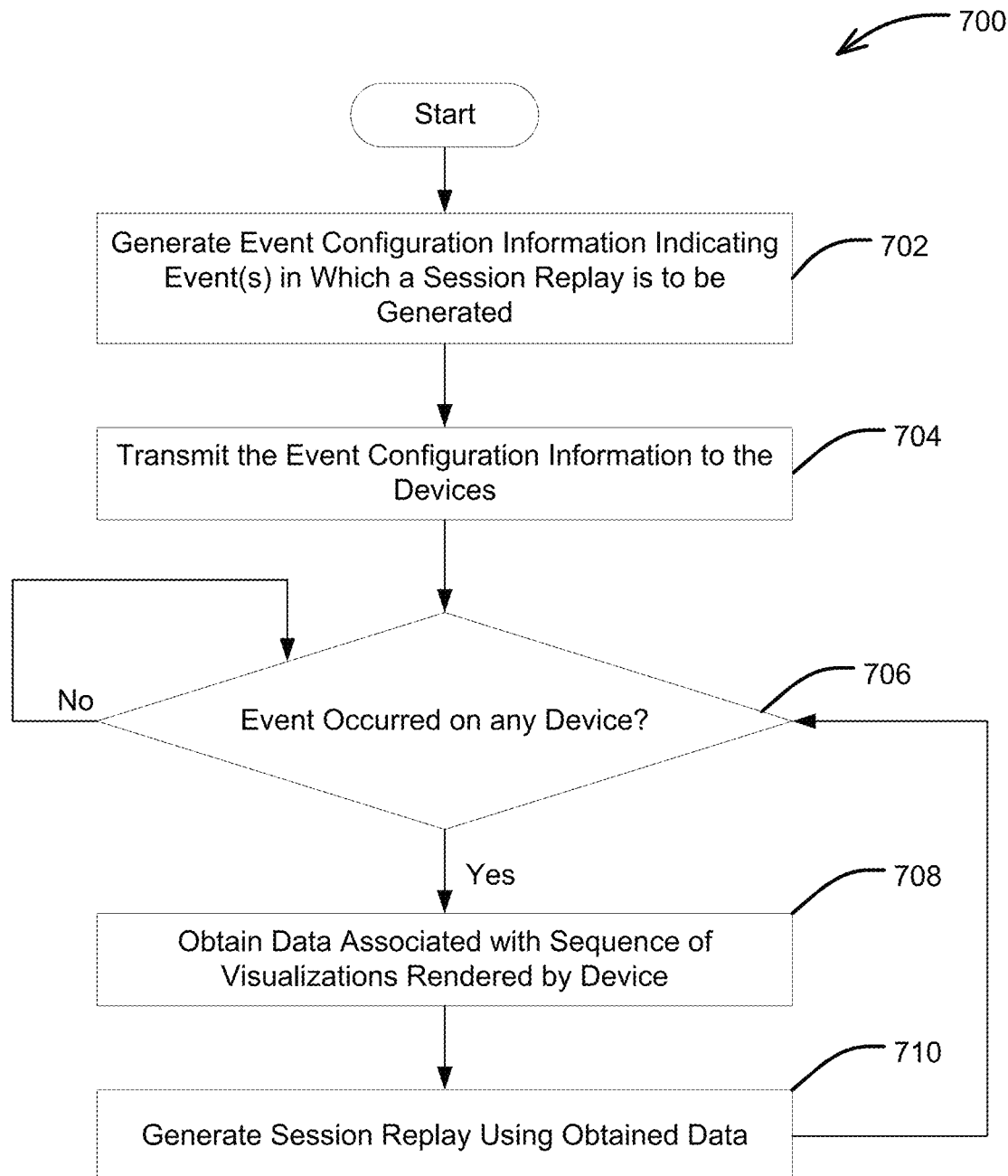
FIG. 7A illustrates an example process of obtaining data from device(s) to generate replay(s) of application session(s), according to some embodiments of the technology described herein.

FIG. 7A illustrates an example process 700 of obtaining data from device(s) to generate replay(s) of application session(s), according to some embodiments of the technology described herein. In some embodiments, process 700 may be performed by session replay system 100 described herein with reference to FIGS. 1A-1C.

Process 700 begins at block 702, where the system generates event configuration information indicating one or more events in which a session replay is to be generated. The system may be configured to generate the event configuration information based on user input (e.g., from a user that may view replays generated by the system). Example techniques of generating event configuration information are described herein with reference to FIG. 2. In some embodiments, the system may generate the event configuration information using user input indicating the event(s) from a set of events that are configurable for monitoring. For example, software instructions executed with or as part of the software application may include instructions for monitoring and detecting the set of events. The system may generate event configuration information that enables execution of the instructions associated with the event(s), and disable execution of the instructions associated with the other event(s). In some embodiments, the system may generate the event configuration information using user input indicating a set of condition(s) defining an event. The system may generate event configuration information that configures a device to monitor for occurrence of the event by determining whether the set of condition(s) is met.

Next, process 700 proceeds to block 704, where the system transmits the event configuration information to the devices. The event configuration information may cause the devices to monitor for occurrence of the event(s) indicated by the event configuration information (e.g., by enabling execution of software instructions and/or causing the device to determine whether a set of condition(s) is met). In some embodiments, event detection functionality may be executed on the devices as part of executing the software application. The event detection functionality may be configured based on the event configuration information to monitor for occurrence of the event(s). An example process of how a device monitors for occurrence of event(s) is described herein with reference to FIG. 7B.

Next, process 700 proceeds to block 706, where it is determined whether an event occurred on any of the devices. Occurrence of an event may be detected based on data obtained during a session of the software application on a device. Example techniques of detecting occurrence of an event are described herein with reference to FIG. 7B. For example, the occurrence of an event may be detected by the device.

If at block 706, occurrence of an event is detected on any device, then process 700 proceeds to block 708, where the system obtains data associated with a sequence of visualizations rendered by the device in a session of the software application. Example data that may be obtained is described herein. Next, process 700 proceeds to block 710, where the system generates a session replay for the session using the data obtained at block 710. An example process of obtaining data associated with a sequence of visualizations rendered in an application session and generating a session replay using the data is described herein with reference to FIG. 8.

If at block 706, the occurrence of an event is not detected, then process 700 remains at block 706. The system does not need to perform any further processing to obtain session replay data or to generate a session replay. In this manner, the system resources are reserved for cases where one of the event(s) indicated by the event configuration information occurs on a device (e.g., to allocate resources to sessions of interest to a user).

Figure 7B:
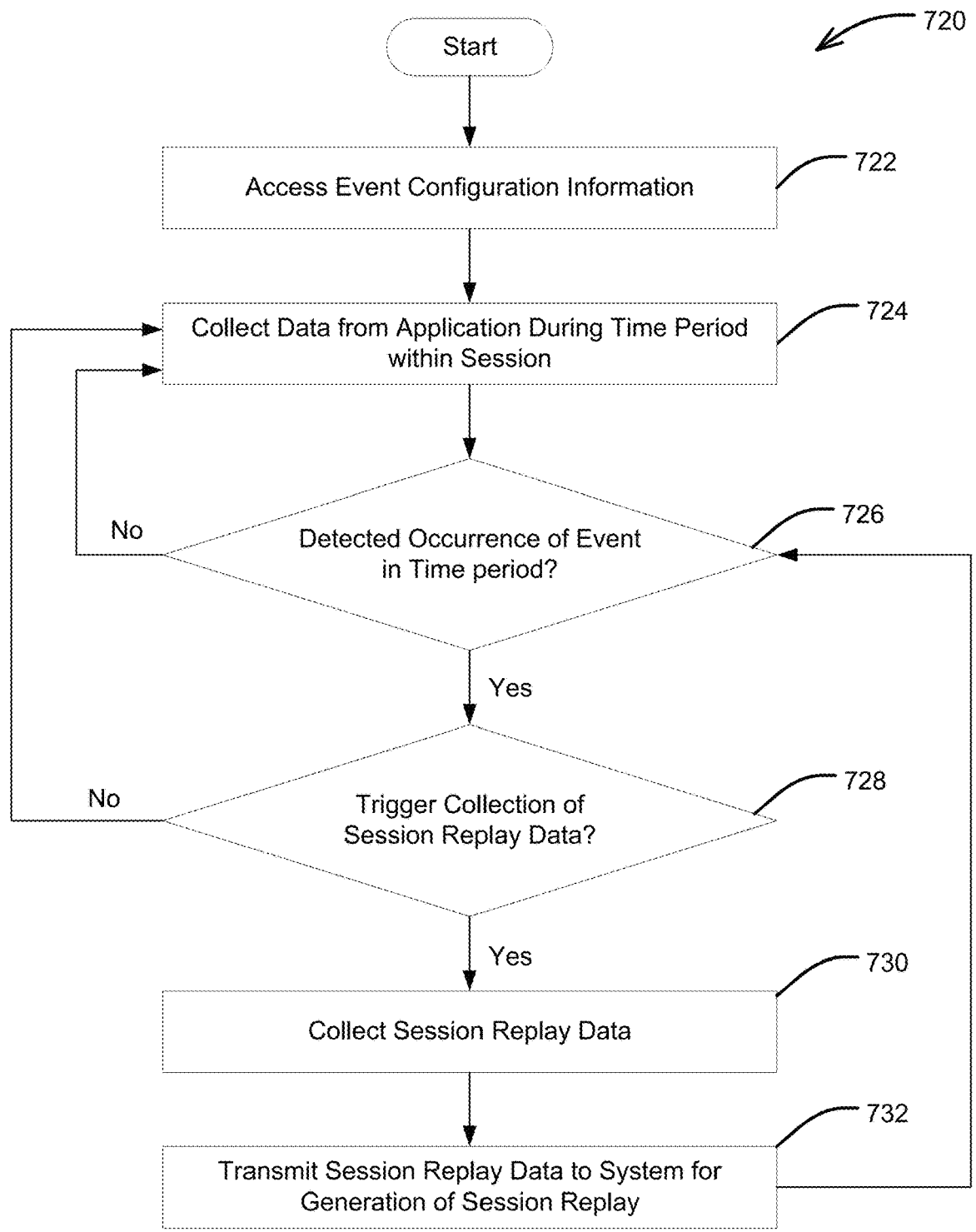
FIG. 7B illustrates an example process of capturing data from a device to generate a replay of a session of a software application executed by the device, according to some embodiments of the technology described herein.

FIG. 7B illustrates an example process 720 of capturing data from a device to generate a replay of a session of a software application executed by the device, according to some embodiments of the technology described herein. In some embodiments, process 720 may be performed by the data capture module 102 of the session replay system 100 described herein with reference to FIGS. 1A-1C. For example, the process 720 may be performed by the event detection component 102A and the session replay data collection component 102C of the data capture module 102. In some embodiments, the process 720 may be performed by the device executing the software application.

Process 720 begins at block 722, where the device accesses event configuration information. The event configuration information may indicate one or more events in which the device is to transmit session replay data. Example event configuration information is described herein with reference to FIG. 2. In some embodiments, the event configuration information may be received from another system (e.g., server(s) of the session replay system 100). In some embodiments, the event configuration information may be integrated into the software application program. For example, the event configuration information may be configurable values of the software application. In some embodiments, the device may access the event configuration information (e.g., as part of executing the software application). For example, the device may obtain the event configuration information from a remote storage location through the Internet.

Next, process 720 proceeds to block 724, where the device collects data from the software application during a time period of the session. The device may collect application data for a specified amount of time in the session (e.g., 10 seconds, 20 seconds, 30 seconds, 40 seconds, 50 seconds, or 60 seconds). The device may obtain data that allows the device to detect occurrence of the event(s) indicated by the event configuration information. Example data that may be collected at block 724 is described herein with reference to the event detection component 102A of FIGS. 1B-1C.

Next, process 720 proceeds to block 726, where the device determines whether any of the event(s) indicated by the event configuration information have occurred. The device uses the data collected during the time period to determine whether any of the event(s) have occurred. The device may determine whether condition(s) indicative of occurrence the event(s) are met to detect occurrence of the event(s).

If, at block 726 the device does not detect occurrence of any event in the time period, then process 720 returns to block 724, where the device collects application data from a subsequent time period in the application session.

If, at block 726, the device detects occurrence of any of the event(s), then process 720 proceeds to block 728, where the device determines whether to trigger collection of session replay data.

In some embodiments, the device may determine to trigger collection of session replay data at block 728 in response to detecting occurrence of the event at block 726. For example, the device may proceed to block 730 to collect session replay data and then block 732 to transmit the session replay data in response to detecting occurrence of any event at block 726.

In some embodiments, the device may perform further processing after detecting the occurrence of the event to determine whether to trigger collection of session replay data at block 728. In some embodiments, the event configuration information may indicate a desired frequency at which the detected event is to result in transmission of session replay data. For example, the event configuration information may indicate a fraction or percentage of instances of the detected event that are to trigger collection of session replay data. The device may use the indicated frequency to determine whether to trigger collection of session replay data.

In some embodiments, the device may determine a random value and compare the random value to a threshold determined based on the desired frequency for the event. The device may determine whether to trigger collection of the session replay data based on a result of the comparison. As an example, the event configuration information may indicate that 60% of occurrences of the event are to trigger collection of session replay data. In this example, the device may determine a random value between 0 and 1, and compare the random value to 0.4. If the random value is greater than 0.4, then the device may determine to trigger collection of session replay data. If the random value is less than 0.4, then the device may determine to not trigger collection of session replay data. This may cause approximately 60% of occurrences of the event across all sessions to trigger collection of session replay data.

If the device determines to not trigger collection of session replay data at block 728, then process 720 proceeds to block 724, where the device collects data from the software application during a subsequent time period in the session.

If the device determines to trigger collection of session replay data at block 728, then process 720 proceeds to block 730, where the device collects session replay data. In some embodiments, the device may collect data associated with a sequence of visualizations rendered by the device during the session (e.g., in a GUI of the software application). Example techniques of collecting data associated with a sequence of visualizations are described herein.

Figure 8:
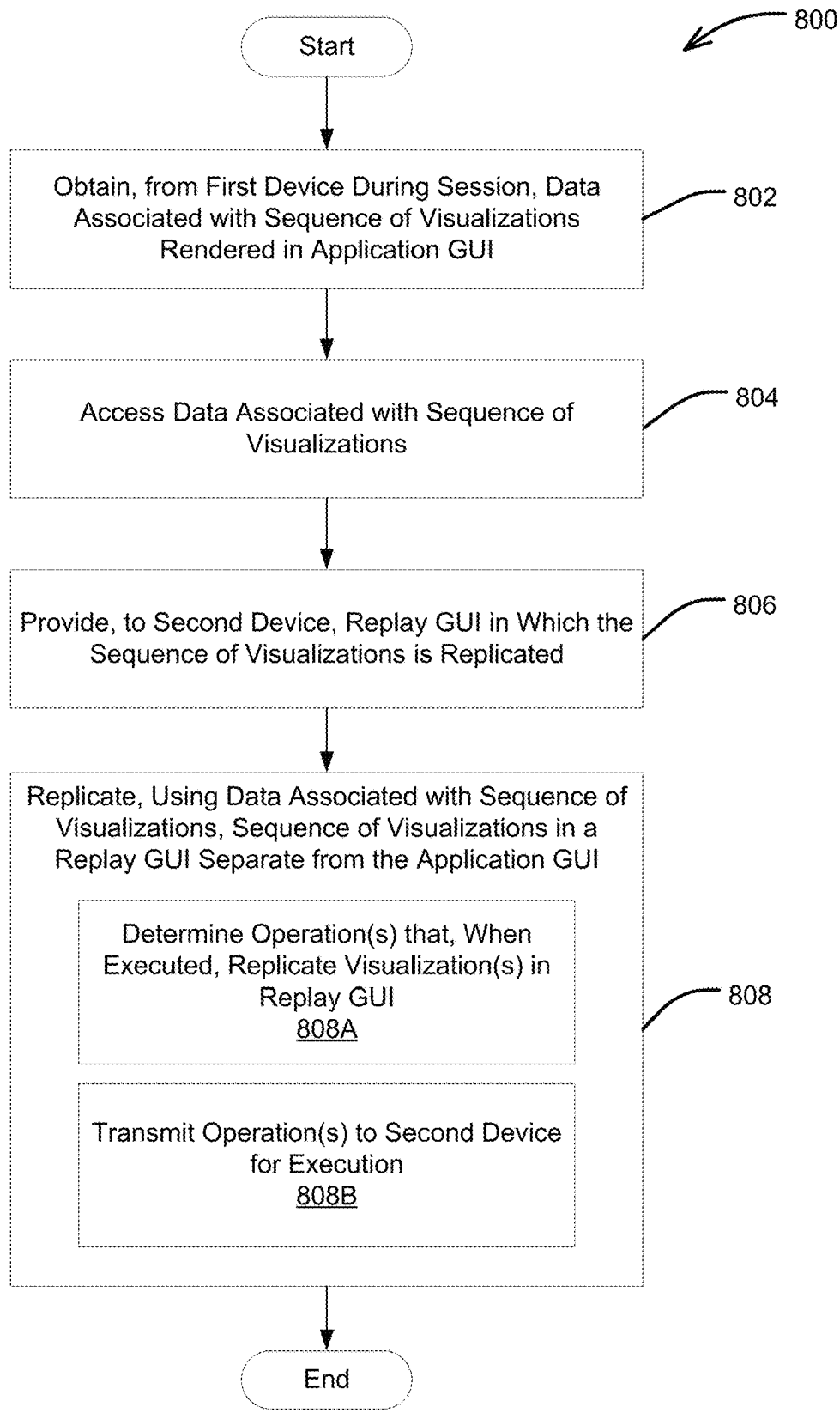
FIG. 8 illustrates an example process of replaying a sequence of visualizations rendered in a GUI of an application executed by a first device on a display of a second device, according to some embodiments of the technology described herein.

After collecting session replay data at block 730, process 720 proceeds to block 732, where the device transmits the session replay data to a system (e.g., server(s) of session replay system 100) for generation of a replay of the session (e.g., as described herein with reference to FIG. 8). The system may store the session replay data, and use the data to generate the session replay. A replay of the session may then be viewed by other devices (e.g., using an Internet browser application).

FIG. 8 illustrates an example process 800 of replaying a sequence of visualizations rendered in a GUI of an application executed by a first device on a display of a second device, according to some embodiments of the technology described herein. In some embodiments, process 800 may be performed by session replay system 100 described herein with reference to FIGS. 1A-1C. As an example, process 800 may be performed to replay a session of a mobile application being executed by a mobile device.

In some embodiments, process 800 may be performed as part of process 700 described herein with reference to FIG. 7A. For example, process 800 may be performed after the occurrence of an event in which collection of session replay data for a session is triggered (e.g., at blocks 708-710 of process 700).

Process 800 begins at block 802, where the system performing process 800 obtains, from the first device (e.g., a mobile device), data associated with a sequence of visualizations rendered in the application GUI (e.g., a mobile application GUI).

In some embodiments, the system may obtain data associated with a visualization rendered in the application GUI by obtaining data indicating visual attribute(s) of a graphical element. The system may obtain the data using a software object (e.g., an instance of a software class) representing the graphical element in code of the application. For example, the system may use methods provided by the software object to obtain information about visual attributes of the graphical element that are indicative of a change in appearance of the graphical object (e.g., color, font, dimensions, rotation, and/or other attributes).

In some embodiments, the system may obtain data associated with a visualization rendered in the application GUI by obtaining one or more images of a portion of the application GUI. The system may obtain image(s) of a portion of the application GUI including a graphical element that was modified in the visualization. The system may identify the portion of the application GUI including the graphical element, and then obtain an image of the portion of the application GUI (e.g., by performing a screen clip operation). In some embodiments, the system may identify the portion of the application GUI including the graphical element by accessing an indication (e.g., coordinates) of a boundary of the graphical element from a software object (e.g., an instance of a software class) representing the graphical element. For example, the system may execute a method that returns coordinates defining a boundary of the graphical element in the application GUI.

In some embodiments, the system may obtain data associated with a visualization rendered in the application GUI by obtaining an indication of operation(s) executed by the first device to render the visualization. The system may identify the operations and obtain a record of the operations. For example, the system may detect execution of certain methods (e.g., methods provided by a software object representing a GUI and/or graphical elements therein) and store a record of the methods. The methods may be those that result in rendering a visualization in the application GUI.

In some embodiments, the system may obtain data using different techniques described herein to obtain data associated with different visualizations in the sequence of visualizations rendered in the application GUI. For example, the system may obtain image(s) of a first visualization and obtain data indicating visual attributes of a graphical element for a second visualization. In some embodiments, the system may determine a technique to use based on a visualization. For example, in some embodiments, the system may determine whether it is possible to obtain information from a software object indicating visual attributes of a graphical element updated as part of a visualization. If so, the system may obtain data indicating the visual attributes of the graphical element using a software object representing the graphical element. Otherwise, the system may obtain image(s) of the visualization. As another example, in some embodiments, the system may determine whether it is able to identify a set of operation(s) to replicate a visualization. If the system determines that it can identify such a set of operation(s), the system may obtain data indicating changes in visual attributes of a graphical element and use the data to determine a set of operation(s) (e.g., drawing operations) that can be executed to replicate the visualization. If the system determines that it cannot identify such a set of operation(s), the system may obtain image(s) of the visualization.

In some embodiments, the system may store data associated with a sequence of visualizations rendered in an application GUI in a datastore (e.g., datastore 109 of session replay system 100 described herein with reference to FIGS. 1A-1D). For example, the sequence of visualizations may be visualizations rendered in a session of the software application. The system may store the data in the datastore in a record associated with the session. The data may subsequently be accessed for replaying the session.

Next, process 800 proceeds to block 804, where the system accesses data associated with the sequence of visualizations. The system may access the data stored in a datastore of the system. In some embodiments, the system may access a record associated with a session storing the data associated with the rendered visualizations. The data may represent the session.

Next, process 800 proceeds to block 806, where the system provides, to the second device, a replay GUI. In some embodiments, the system may provide the replay GUI in an interface of an application. For example, the system may provide the replay GUI in a GUI of a webpage of an Internet website that can be accessed by the second device using an Internet browser application. The replay GUI may be provided through a web application. As another example, the system may provide the replay GUI through an interface of an application installed on the second device.

In some embodiments, the system may provide a replay GUI with a control interface to control replication of the sequence of visualizations in the replay GUI. For example, the control interface may be a playback interface with play/pause control, forward/rewind controls, and/or a draggable element to control a position in a sequence of replicated visualizations. A user of the second device may use the control interface to navigate through a replay consisting of a sequence of replications of the visualizations rendered on the first device.

Next, process 800 proceeds to block 808, where the system uses the data associated with the sequence of rendered visualizations, to replicate the sequence of visualizations in a replay GUI separate from the application GUI. The system may generate a new GUI as the replay GUI. In some embodiments, the system may use a software object (e.g., an instance of a software class) representing a screen of the device to generate the replay GUI in a software application separate from the application from which the visualizations are being replayed. For example, the system may use an instance of a canvas software class provided in the Skia software library in a software application to generate the replay GUI. The system may replicate the sequence of rendered visualizations in the replay GUI.

At subblock 808A of block 808, the system determines a set of operation(s) to replicate one or more visualizations. In some embodiments, the system may determine a set of drawing operation(s) to replicate the visualization. For example, the set of drawing operation(s) may be a set of drawing operations provided by the canvas software class from the Skia library. Data associated with the visualization may indicate one or more changes in visual attributes of a graphical element that occurred in the visualization. The system may use the data to determine the set of operation(s) (e.g., drawing operations) that, when executed, replicate the change(s) in the visual attributes in the replay GUI. For example, the set of operation(s) may comprise a set of primitive drawing operations that, when executed, result in rendering a replicated visualization in the replay GUI.

In some embodiments, the data associated with a visualization may be image(s) of the visualization. The system may determine a set of operation(s) that place image(s) of visualization(s) in the replay GUI. The operation(s), when executed by the second device, may cause the second device to position the image(s) at locations within a replay GUI determined by the system. The placement of image(s) may result in replicating changes from the application GUI in the replay GUI.

In some embodiments, the data associated with a visualization may be an indication of one or more operations (e.g., drawing operations) performed by the first device to render the visualization. The determined set of operation(s) may include the operation(s) performed by the first device. The system may transmit the operation(s) to the second device for execution. When executed by the second device, the operation(s) cause the second device to render the visualization in the replay GUI. For example, the first device may have used a canvas class instance to execute one or more operations to render a visualization. The data obtained at block 802 may indicate those operation(s). The second device may use a canvas class instance to represent the replay GUI, and execute the same operation(s) to replicate visualization in the replay GUI.

At subblock 808B of block 808, the system transmits the determined operation(s) to the second device for execution. The second device may execute the operation(s) to replicate the visualization(s). For example, an Internet browser application of the second device may execute the operation(s) to render replicated visualization(s) in the replay GUI. In some embodiments, the system may execute the operation(s) using server(s) of the system to replicate the visualization(s) in the replay GUI. For example, the system may execute the operation(s) and display the replay GUI during execution in order to render replicated visualization(s) in the replay GUI.

In some embodiments, the system may use different replication techniques described herein to replicate different ones of the rendered visualizations. For example, the system may position image(s) in a replay GUI to replicate certain visualizations, and determine and execute a set of operation(s) to replicate other visualizations. In some embodiments, when the system can determine and execute a set of operation(s) to replicate a visualization it may do so. Otherwise, the system may place an image of the visualization in the replay GUI. In some embodiments, the system may store categories of visualizations that the system can determine a set of operations to replicate. The system may determine a technique to use in replicating a given visualization based on whether it belongs to a category for which the system can determine a set of operations to replicate. If so, the system may determine a set of operations and execute those operations to replicate the visualization. Otherwise, the system may replicate the visualization by placing image(s) of the visualization in the replay GUI.

Figure 9A:
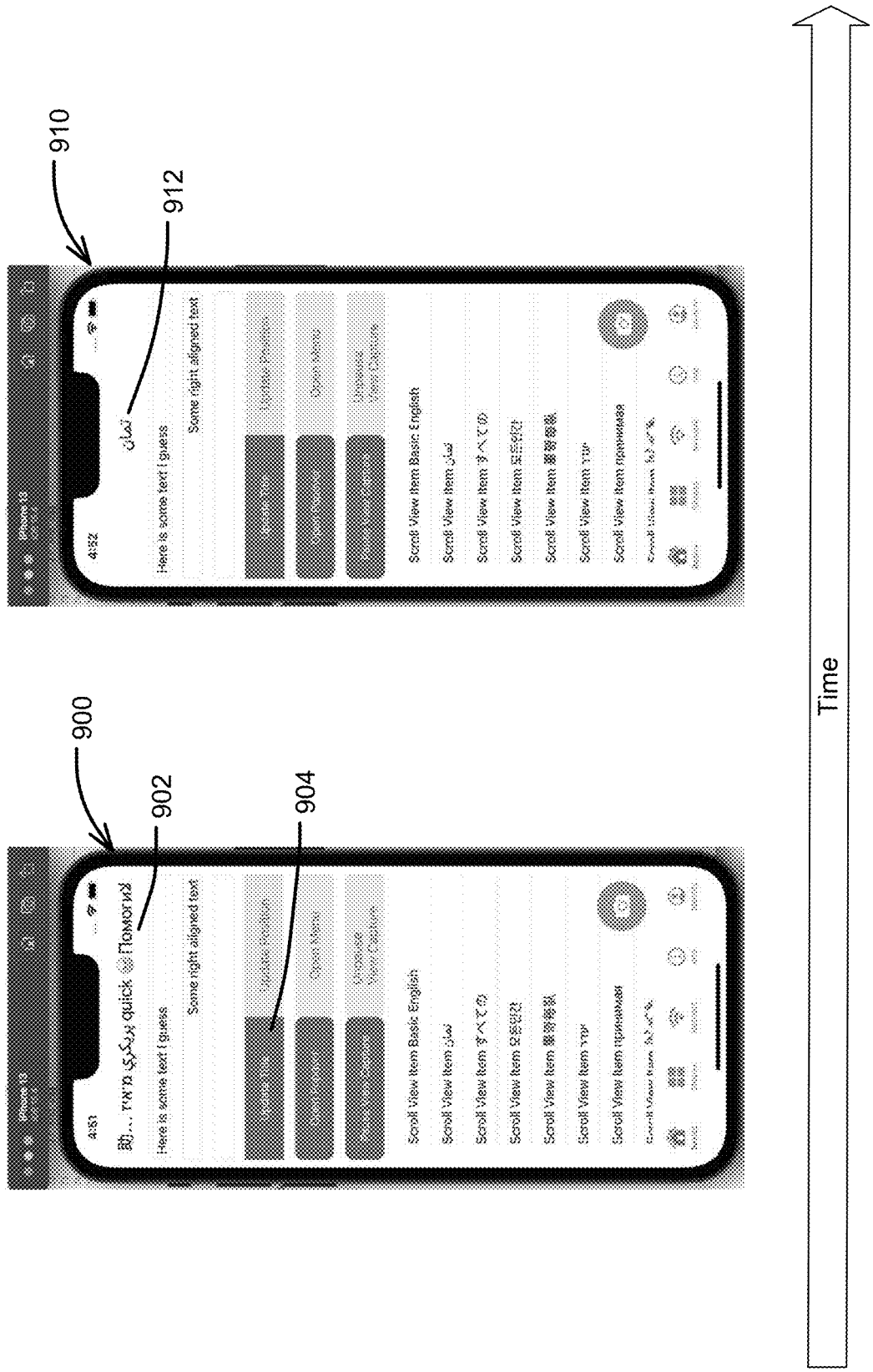
FIG. 9A illustrates a visualization rendered in a mobile application GUI, according to some embodiments of the technology described herein.

FIG. 9A illustrates a visualization rendered in a software application GUI 900, according to some embodiments of the technology described herein. As shown in FIG. 9A, the application GUI 900 includes title text 902 and a button 904 for updating the title. Reference number 910 shows the application GUI 900 after an update to the title text 902 in response to selection of the update title button 904 (e.g., by tapping the button 904 on a touch screen) in the GUI 900. Selection of the update title button 904 causes the mobile application to render, in the GUI 900, a visualization comprising of updating the title text 902 to title text 912.

Figure 9B:
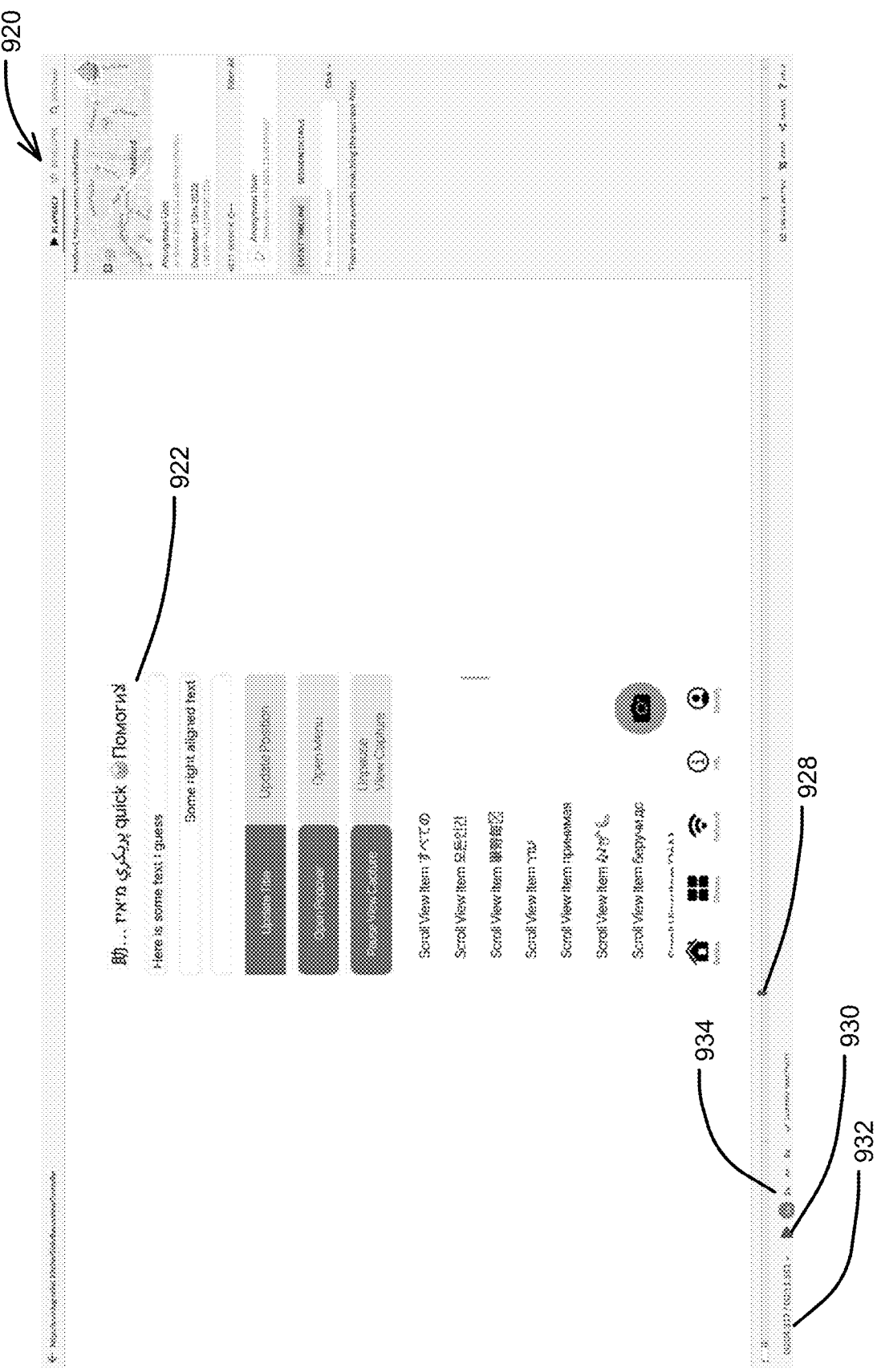
FIGS. 9B-9D illustrate replication of the visualization of FIG. 9A displayed in a GUI of another application, according to some embodiments of the technology described herein.
Figure 9C:
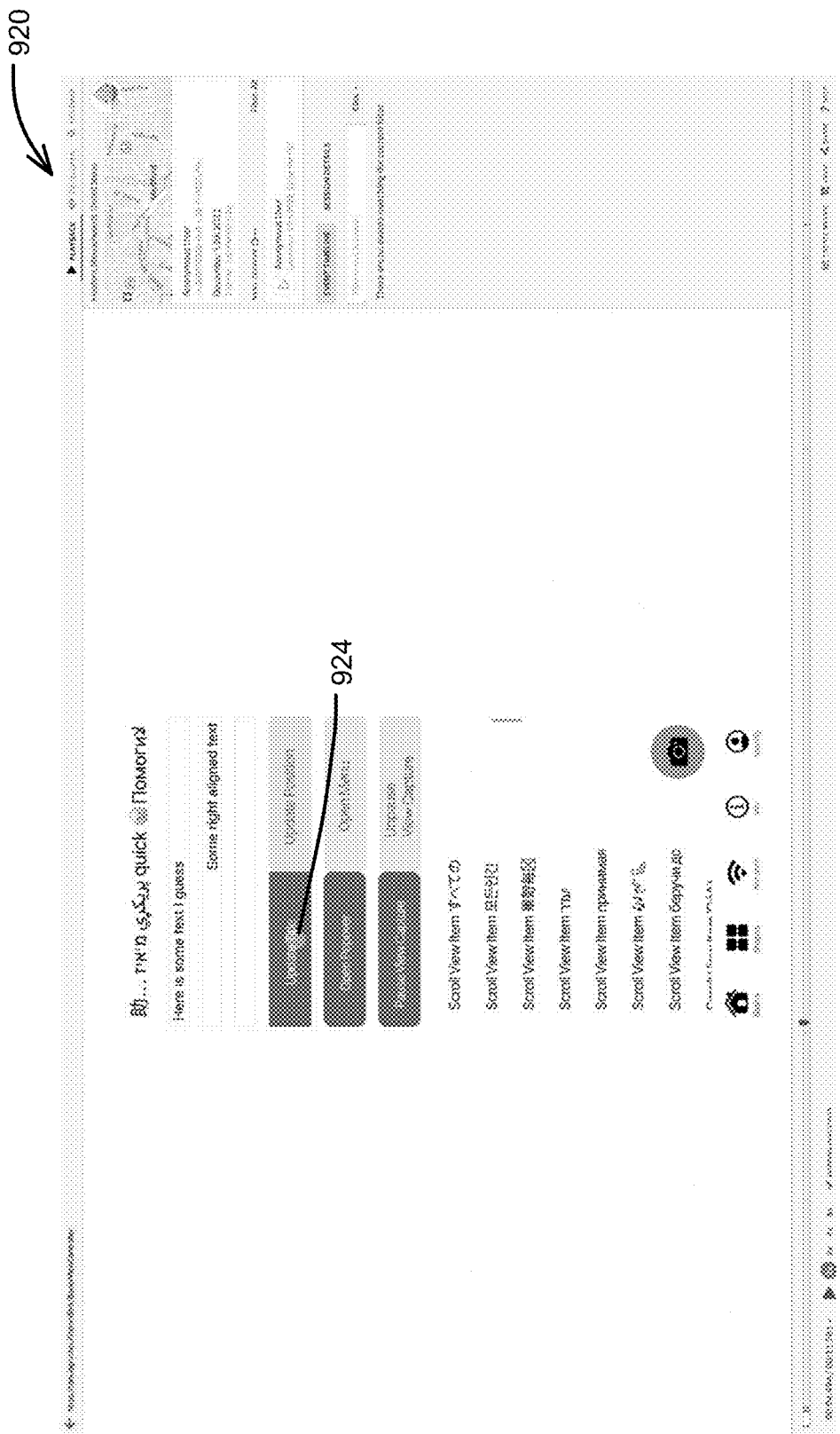

FIGS. 9B-9C illustrates a replay GUI 920 for displaying a replay of the rendered visualization of FIG. 9A, according to some embodiments of the technology described herein. For example, the replay GUI 920 may be one generated by the session replay system 100 described herein with reference to FIGS. 1A-1D. As shown in FIG. 9B, the replay GUI 920 shows a replication of the mobile application GUI 900. In FIG. 9B, the replication of the application GUI 900 includes title text 922, which matches the title text of the application GUI 900 prior to selection of the update title button 904 in the application GUI 900.

As shown in FIG. 9B, the replay GUI 920 includes a playback control interface to control display of a replay of one or more visualizations from an application GUI. The control interface includes a draggable element 928 that can be used by a user to navigate through a replay (e.g., through a sequence of replicated visualizations). The control interface further includes a play/pause button 930 that can be used to resume or stop a replay. The control interface also includes an indication 932 of time within a session being replayed. The control interface further includes options 934 to control a speed at which the replay is displayed. In the example of FIG. 9B, the options 934 include 1× (i.e., no acceleration), 2×, 4×, and 8×.

FIG. 9C shows an indication of a user selection 924 of the update title button 904 in the application GUI 900 of FIG. 9A. In the example of FIG. 9C, the replay GUI 920 indicates selection of the button with a dot to provide a viewer of the replay GUI an indication of a user action performed in the application GUI 900. Although the application GUI 900 may not provide an indication of the button selection, the replay GUI may provide the indication to give the user an indication of an action provided by the user (e.g., touching of the button 904 in the application GUI 900).

Figure 9D:
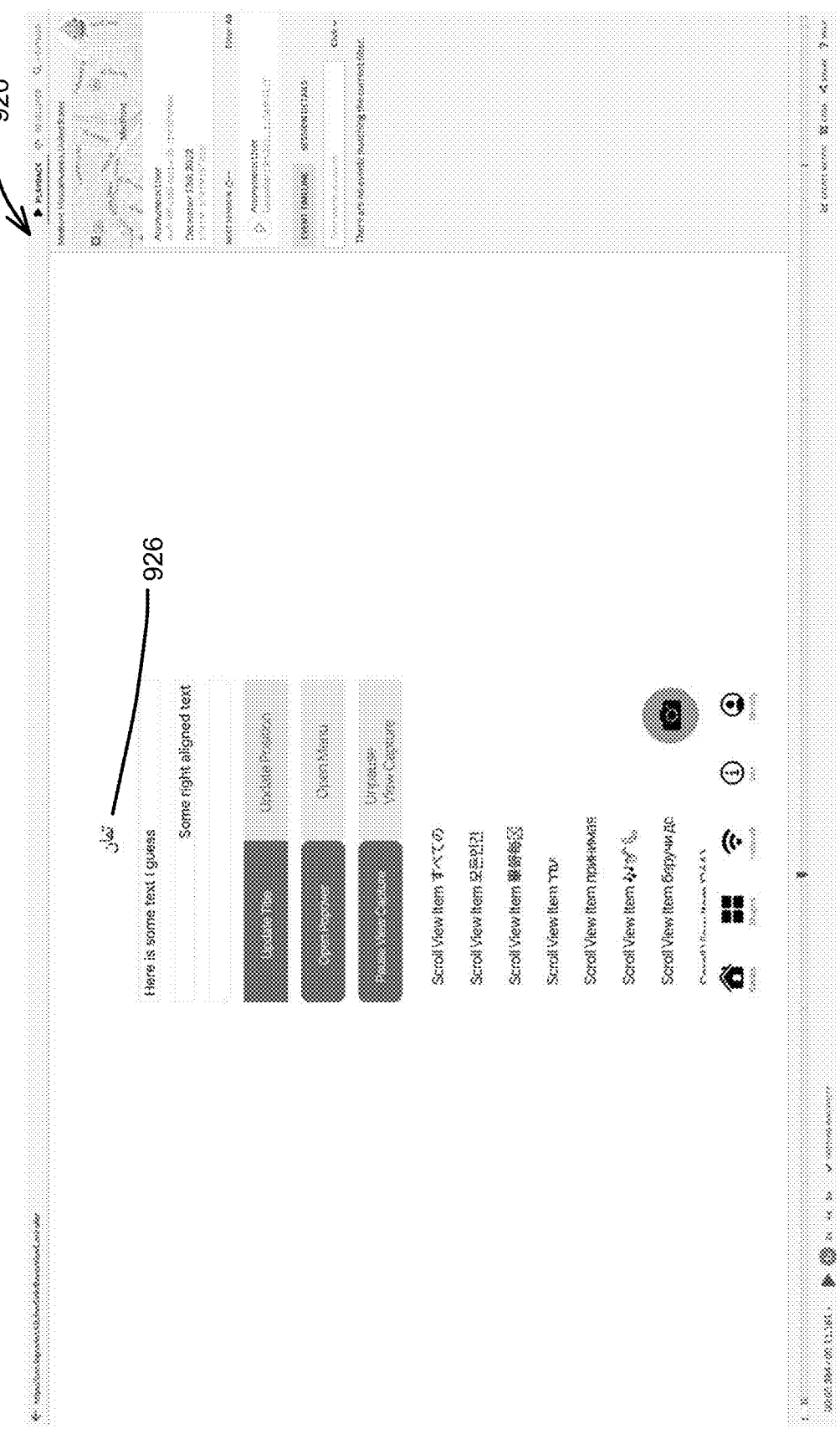

FIG. 9D shows the replay GUI 920 after replicating the visualization from the application GUI 900. The GUI 920 shows an updated title text 926. As shown in FIG. 9D, the replay GUI 920 now shows an updated title 926 like the application GUI 900 after selection of the update title button 904. The update may have been performed using replication techniques described herein. For example, the title may have been updated by executing one or more operations determined to replicate the title update rendered in the application GUI 900 (e.g., using data indicating the updated text). As another example, the title may have been updated in the replay GUI 920 by placing an image of the updated title obtained from the mobile application in the replay GUI 920. As another example, the title may have been updated by execution of an operation that was executed by the mobile application.

Figure 10:
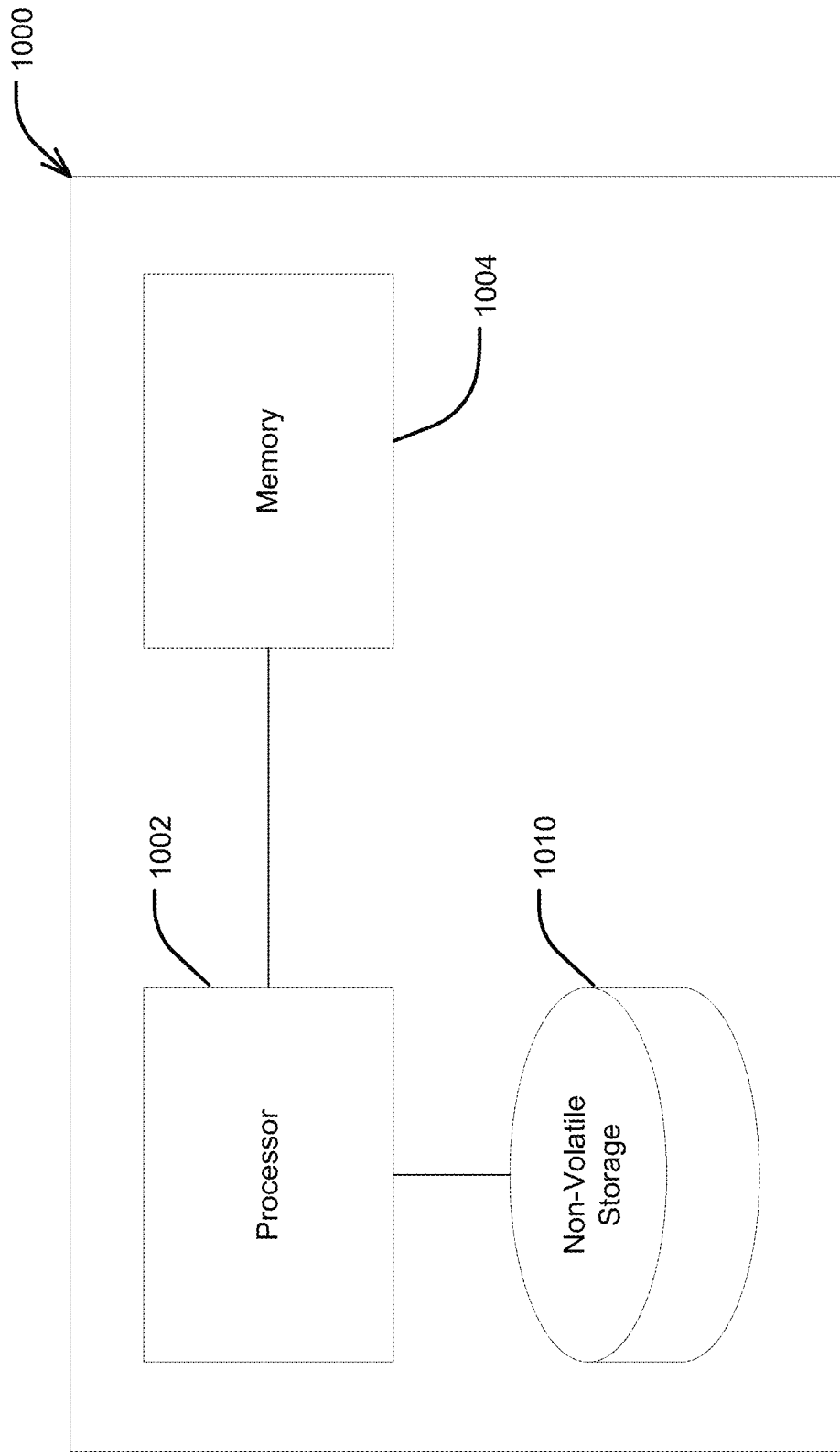
FIG. 10 is a block diagram of an illustrative computing system that may be used in implementing some embodiments of the technology described herein.

FIG. 10 is an example computer system 1000 which may be used to implement some embodiments of the technology described herein. The computing system 1000 may include one or more computer hardware processors 1002 and non-transitory computer-readable storage media (e.g., memory 1004 and one or more non-volatile storage devices 1006). The processor(s) 1002 may control writing data to and reading data from (1) the memory 1004; and (2) the non-volatile storage device(s) 1006. To perform any of the functionality described herein, the processor(s) 1002 may execute one or more processor-executable instructions stored in one or more non-transitory computer-readable storage media (e.g., the memory 1004), which may serve as non-transitory computer-readable storage media storing processor-executable instructions for execution by the processor(s) 1002.

The above-described embodiments of the technology described herein can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, aspects of the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments described above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the technology as described above. As used herein, the term "computer-readable storage medium" encompasses only a non-transitory computer-readable medium that can be considered to be a manufacture (i.e., article of manufacture) or a machine. Alternatively or additionally, aspects of the technology described herein may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the technology as described above. Additionally, it should be appreciated that according to one aspect of this embodiment, one or more computer programs that when executed perform methods of the technology described herein need not reside on a single computer or processor, but may be distributed in a modular fashion amongst a number of different computers or processors to implement various aspects of the technology described herein.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, of which examples are provided herein including with reference to FIG. 6. The acts performed as part of any of the methods may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by an "actor" or a "user." It should be appreciated that an "actor" or a "user" need not be a single individual, and that in some embodiments, actions attributable to an "actor" or a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of capturing data from a device to replay a session of a software application executed by the device, the method comprising:
   using a processor of the device to perform:
      accessing event configuration information indicating one or more events for which data for generating a session replay is to be transmitted from the device, wherein the event configuration information comprises an indication of a frequency at which occurrence of the one or more events is to trigger collection of data to generate a session replay;
      collecting data from the software application during a time period within the session;

determining, using the data collected during the time period and the event configuration information, whether an event of the one or more events occurred during the time period;

determining whether to trigger collection of data to generate a session replay based on whether an event of the one or more events occurred during the time period, wherein determining whether to trigger collection of data to generate a session replay based on whether an event of the one or more events occurred in the time period comprises determining whether to trigger the collection of data to generate a session replay based on the indicated frequency;

when it is determined to trigger collection of data to generate a session replay:

transmitting, to a system separate from the device, data associated with a sequence of visualizations rendered by the device in a graphical user interface (GUI) of the software application during the session to generate the session replay.

2. The method of claim 1, further comprising:

collecting data from the software application during a previous time period of the session, the previous time period prior to the time period;

determining, using the data collected during the previous time period and the event configuration information, that none of the one or more events occurred during the previous time period; and determining to not trigger collection of data to generate a session replay based on determining that none of the one or more events occurred during the previous time period.

3. The method of claim 1, wherein the method further comprises:

suppressing transmission of data associated with a sequence of visualizations rendered by the device in the GUI of the software application during the session when it is determined to not trigger collection of data to generate a session replay.

4. The method of claim 1, wherein determining whether an event of the one or more events occurred during the time period comprises determining whether a length of the session reached a threshold amount of time during the time period.

5. The method of claim 1, wherein determining whether an event of the one or more events occurred during the time period comprises determining whether a user accessed a particular portion of the GUI of the software application during the time period.

6. The method of claim 1, wherein determining whether an event of the one or more events occurred during the time period comprises determining whether a user interacted with a particular selectable element in the GUI of the software application during the time period.

7. The method of claim 1, wherein determining whether an event of the one or more events occurred during the time period comprises determining whether a network communication error occurred during the time period.

8. The method of claim 1, wherein determining whether an event of the one or more events occurred during the time period comprises determining whether a particular log message appeared in a software application log during the time period.

9. The method of claim 1, wherein determining whether an event of the one or more events occurred during the time period comprises determining whether a particular graphical element appeared in the GUI of the software application during the time period.

10. The method of claim 1, wherein:

the event configuration information comprises a set of one or more conditions defining at least one of the one or more events; and determining, using the data collected during the time period and the event configuration information, whether an event of the one or more events occurred during the time period comprises:

determining whether the set of one or more conditions defining the at least one event was met during the time period.

11. The method of claim 1, wherein determining whether to trigger collection of data to generate a session replay based on whether an event of the one or more events occurred during the time period comprises determining to trigger collection of data to generate a session replay in response to determining that an event of the one or more events occurred during the time period.

12. The method of claim 1, wherein determining whether to trigger the collection of data to generate a session replay based on the indicated frequency comprises:

generating a random value based on the indicated frequency at which occurrence of the event is to trigger collection of data to generate a session replay; and determining whether to trigger the collection of data to generate a session replay using the random value.

13. The method of claim 1, wherein the time period is approximately 30 seconds of the session.

14. The method of claim 1, wherein the one or more events is a plurality of events.

15. A non-transitory computer-readable storage medium storing instructions that, when executed by a processor, cause the processor to perform a method of capturing data from a device to replay a session of a software application executed by the device, the method comprising:

accessing event configuration information indicating one or more events for which data for generating a session replay is to be transmitted from the device, wherein the event configuration information comprises an indication of a frequency at which occurrence of the one or more events is to trigger collection of data to generate a session replay;

collecting data from the software application during a time period within the session;

determining, using the data collected during the time period and the event configuration information, whether an event of the one or more events occurred during the time period;

determining whether to trigger collection of data to generate a session replay based on whether an event of the one or more events occurred during the time period, wherein determining whether to trigger collection of data to generate a session replay based on whether an event of the one or more events occurred in the time period comprises determining whether to trigger the collection of data to generate a session replay based on the indicated frequency;

when it is determined to trigger collection of data to generate a session replay:

transmitting, to a system separate from the device, data associated with a sequence of visualizations rendered by the device in a graphical user interface (GUI) of the software application during the session to generate the session replay.

16. A system for generating replays of sessions of a software application executed by a plurality of devices, the system comprising:
- a processor; and
- a non-transitory computer-readable storage medium storing instructions that, when executed by the processor, cause the processor to:
  - generate event configuration information indicating one or more events in which a session replay is to be generated, wherein the event configuration information comprises an indication of a frequency at which occurrence of the one or more events is to trigger collection of data to generate a session replay;
  - transmit, to the plurality of devices, the event configuration information, wherein the event configuration information causes the plurality of devices to monitor for occurrence of the one or more events during execution of the software application and to transmit data for generation of a session replay based on detecting occurrence of any of the one or more events and on the indicated frequency;
  - after occurrence of at least one of the one or more events at the indicated frequency on at least one of the plurality of devices:
    - obtain, from the at least one device, data associated with at least one sequence of visualizations rendered by the at least one device in a graphical user interface (GUI) of the software application during at least one session of the software application executed by the at least one device; and
    - generate, using the data associated with the at least one sequence of visualizations rendered by the at least one device in the GUI of the software application, at least one replay of the at least one session.

17. The system of claim 16, wherein the one or more events include at least one of:
- a length of the at least one session reached a threshold amount of time;
- access by a user of a particular component of the GUI of the software application;
- user interaction with a particular selectable element in the GUI of the software application;
- a network communication error;
- a particular log message appeared in a software application log; or
- appearance of a particular graphical element in the GUI of the software application.

18. The system of claim 16, wherein generating the event configuration information comprises generating a specification of one or more conditions defining an event of the one or more events.

19. The system of claim 16, wherein generating, using the data associated with the at least one sequence of visualizations rendered by the at least one device in the GUI of the software application, the at least one replay of the at least one session comprises:
- determining a set of operations that, when executed by a replay device, replicate one or more visualizations of the at least one sequence of visualizations in a replay GUI displayed by the replay device.

* * * * *